United States Patent [19]
Izaki et al.

[11] Patent Number: 5,571,438
[45] Date of Patent: Nov. 5, 1996

[54] INDUCTION HEATING COOKER OPERATED AT A CONSTANT OSCILLATION FREQUENCY

[75] Inventors: Kiyoshi Izaki, Kadoma; Hideki Omori, Akashi; Kenji Hattori, Kobe; Hirofumi Noma, Otsu, all of Japan

[73] Assignee: Matsushita Electric Industrial Co., Ltd., Kadoma, Japan

[21] Appl. No.: 402,372

[22] Filed: Mar. 13, 1995

[30] Foreign Application Priority Data

Mar. 14, 1994 [JP] Japan ..................... 6-042515

[51] Int. Cl.⁶ ..................... H05B 6/08
[52] U.S. Cl. ............. 219/625; 219/626; 219/663; 219/661; 219/665; 363/97
[58] Field of Search ............... 219/625, 626, 219/661, 663, 664, 665; 363/97, 98, 21

[56] References Cited

U.S. PATENT DOCUMENTS 5,248,866  9/1993  Tanaka et al. ............ 219/663 X
5,353,023  8/1994  Geissler ................... 219/661
5,354,971  10/1994  Chen ....................... 219/661

FOREIGN PATENT DOCUMENTS

| 0405611 | 1/1991 | European Pat. Off. . |
| 0460279 | 12/1991 | European Pat. Off. . |
| 3119686 | 5/1991 | Japan . |
| 3119682 | 5/1991 | Japan . |
| 5-21150 | 1/1993 | Japan . |

*Primary Examiner*—Philip H. Leung
*Attorney, Agent, or Firm*—McDermott, Will & Emery

[57] ABSTRACT

In a switching device of an induction heating cooker, an oppositely poled diode for conducting a reverse current is coupled across the collector-emitter portion of a switching element provided in the first switching device, and turn-ON operation of the switching devices does not OCCUR in normal operation of the DUTY FACTOR $T_2/T_1 \approx 0.5$.

13 Claims, 23 Drawing Sheets

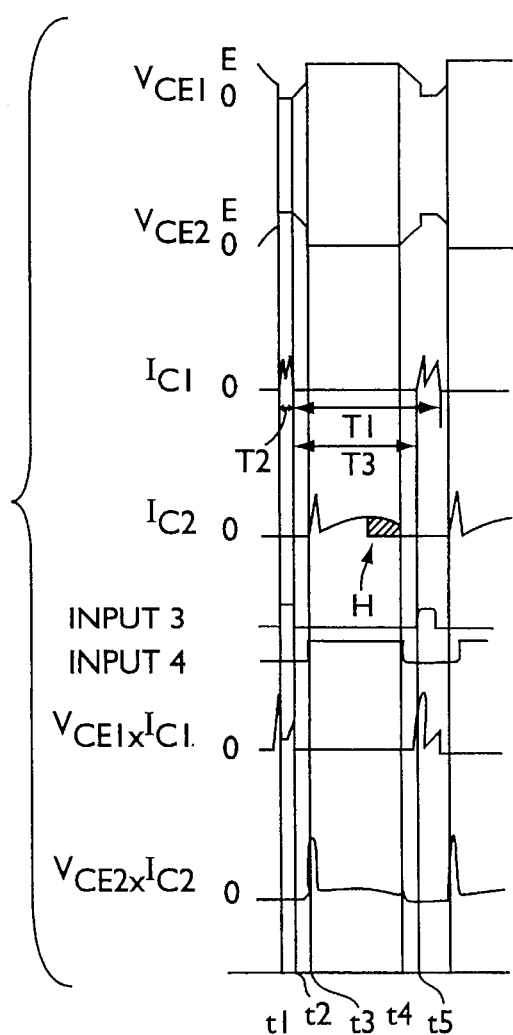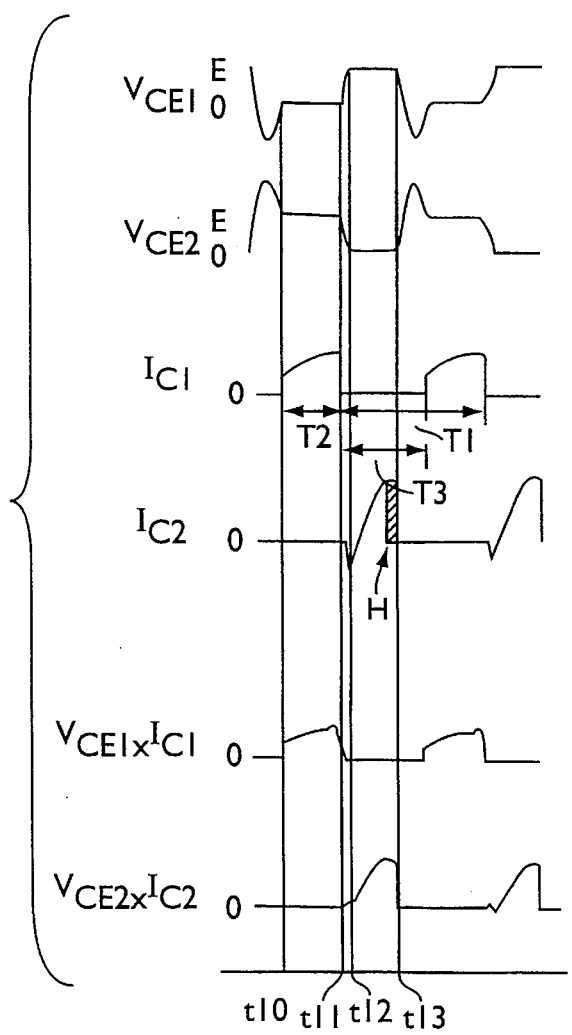

$T_2/T_1 \ll 0.5$ $T_2/T_1 \fallingdotseq 0.5$

INDUCTION HEATING COOKER OPERATED AT A CONSTANT OSCILLATION FREQUENCY

FIELD OF THE INVENTION AND RELATED ART STATEMENT

1. Field of the Invention

The present invention relates generally to an induction heating cooker, and more particularly to an induction cooker which is operated at a constant oscillation frequency.

2. Description of the Related Art

In a conventional induction heating cooker, an input to the induction heating cooker is generally controlled by changing an oscillation frequency. However, in the case that plural induction heating cookers having different oscillation frequencies are arranged in close proximity to each other, interference occurs between electromagnetic waves of the different oscillation frequencies of the plural induction heating cookers due to differences between the plural frequencies. Consequently, there is a problem that utensils put on the induction heating cookers generate beat sound of load by the interference.

In order to solve the above-mentioned problem, an induction heating cooker which is activated at a constant oscillation frequency and is controlled in the input by other method is disclosed in the Japanese published unexamined patent application Hei 5-21150.

Configuration of the induction heating cooker of this prior art is described with reference to FIG. 20, FIG. 21A, FIG. 21B, FIG. 21C and FIG. 22 hereafter. FIG. 20 is a circuit diagram of the conventional induction heating cooker. Referring to FIG. 20, an output of a direct current source 1 is applied to an inverter circuit 2 for inverting the direct current to a high frequency current. The inverter circuit 2 comprises a first switching device 3 of a reverse current blocking type, a second switching device 4 of a reverse current conductive type, a heating coil 15, a first resonance capacitor 6, a second resonance capacitor 8 and a diode 9. The inverter circuit 2 is controlled by a control circuit 7. The control circuit 7 comprises a driving circuit 7A for activating alternately the first switching device 3 and the second switching device 4 with the same frequencies but changing their ON time ratio.

Operation of the conventional induction heating cooker is elucidated with reference to FIG. 21A, FIG. 21B, FIG. 21C and FIG. 22. FIG. 21A and FIG. 21B illustrate waveforms of a voltage $V_{CE1}$ across both terminals 3E and 3F and a current $I_{C1}$ of the switching device 3 and a voltage $V_{CE2}$ across both terminals 4E and 4F and a current $I_{C2}$ of the switching device 4. FIG. 21C is a diagram of a time-enlarged waveform. FIG. 22 is a diagram representing a relation of a ratio $T_2/T_1$ (hereinafter is referred to as DUTY FACTOR which is defined as a ratio of an "ON" time $T_2$ of the first switching device 3 to a period $T_1$ of an oscillation signal) and an input power $P_{in}$ of the induction heating cooker. Since the DUTY FACTOR is defined as the ratio $T_2/T_1$, an "ON" time T3 of the second switching device 4 is a different between the time $T_1$ and the time $T_2$ ($T_3=T_1-T_2$, in the case that a dead time is neglected).

FIG. 21A is a diagram representing waveforms in operation in the case that the DUTY FACTOR $T_2/T_1$ is much smaller than 0.5 (hereinafter is represented as $T_2/T_1 \ll 0.5$) (namely, the input power $P_{in}$ is very small). FIG. 21B is a diagram representing waveforms in operation in the case that the DUTY FACTOR $T_2/T_1$ is approximately 0.5 (hereinafter is represented as $T_2/T_1 \approx 0.5$) (namely, the DUTY FACTOR $T_2/T_1$ is about one half). Moreover, FIG. 21C is a diagram representing enlarged waveforms in "turn-ON operation" (which means that the switching device 3 is made to turn ON at a state that the voltage $V_{CE1}$ is larger than zero ($V_{CE1}>0$)) of the switching device 3 for the DUTY FACTOR $T_2/T_1 \ll 0.5$.

As shown in FIG. 21A and FIG. 21B and FIG. 22, the switching devices 3 and 4 are alternately activated by the driving circuit 7A, and the input power $P_{in}$ of the induction heating a cooker is controlled by changing the DUTY FACTOR $T_2/T_1$. In FIG. 21A and FIG. 21B, hatched parts H represent conducting periods of the diode 9. Moreover, a period between times $t_{10}$ and $t_{11}$ is the period generating an "ON-loss", and a period between times $t_{11}$ and $t_{12}$ is the period generating a "switching loss" in the switching device 3.

As mentioned above, in the conventional configuration and control method of the inverter circuit 2, the input power Pin can be controlled at a constant oscillation frequency.

In the above-mentioned conventional inverter circuit, there is the below-mentioned problem. As shown by the waveforms of FIG. 21A and FIG. 21B, the voltage $V_{CE1}$ is larger than zero when the switching device 3 turns ON in the case of the DUTY FACTOR $T_2/T_1 \ll 0.5$. Since the voltage $V_{CE1}$ is not zero, "zero voltage switching operation" of the switching device 3 is not performed, and the resonance capacitor 8 is connected to the direct current source 1 through the switching device 3. Namely, a mode for short-circuiting the second resonance capacitor 8 is made. Consequently, the current of the resonance capacitor 8 resonates by an inductance of wirings and the capacitance of the resonance capacitor 8, and passes a switching element 3A in the reverse direction during a reverse recovery time of a reverse current blocking diode 3B. Thereby, the switching device 3 is liable to be broken down, and there is a problem that the reliability of the apparatus is lowered.

OBJECT AND SUMMARY OF THE INVENTION

A first object of the present invention is to improve a reliability of a first switching device. A second object of the present invention is to reduce a loss in the switching device and to protect it from an over-current. A third object of the present invention is to reduce the loss by an inexpensive circuit. A fourth object of the present invention is to provide an induction heating cooker of which the switching device is protected from an overvoltage.

Furthermore, a fifth object of the present invention is to detect an inadequate load such as a knife or an aluminum pan and to suspend operation of the induction heating cooker. A sixth object of the present invention is to reduce a power loss in the switching device and a diode and to obtain a high output in a non-magnetic load. A seventh object of the present invention is to reduce a power loss in the switching device and the diode, and to realize a higher output in the non-magnetic load by an inexpensive circuit having a higher reliability than conventional ones. An eighth object of the present invention is to reduce noise and a power loss in the switching device. A ninth object of the present invention is to provide an induction heating cooker of which the noise and the power loss in the switching device is further reduced.

A first mode of the present invention to achieve the first object comprises a heating coil, a first resonance capacitor serially connected to the heating coil, a diode parallelly connected to the first resonance capacitor, a first switching device of a reverse current blocking type, a second switching device of a reverse current conductive type serially connected to the first switching element, a second resonance capacitor parallelly connected to at least one of the switching devices, and a control circuit having a driving circuit of which the first switching device and the second switching device are alternately made conductive at a constant frequency but DUTY FACTOR thereof is variable, and one end of a serially-coupled pair of the heating coil and the first resonance capacitor is connected to the junction of both the switching devices, the other end thereof is connected to a direct current source, and a diode for conducting a reverse current is connected across the collector and the emitter of a switching element of the first switching device.

According to the first mode of the present invention, for the DUTY FACTOR $T_2/T_1 \ll 0.5$, the first switching device turns ON in the state that the voltage $V_{CE1}$ is larger than zero ($V_{CE1} > 0$), and even if the shortcircuit mode of the second resonance capacitor occurs, the current to pass the first switching device in the reverse direction during the reverse recovery time of the reverse current blocking diode of the first switching device is admitted to pass through the diode for conducting the reverse current connected across the switching element. Consequently, the current in the reverse direction does not pass the switching element of the first switching device, and the operation mode for causing breakdown in the reverse direction of the first switching device is deleted, and the lowering of the reliability is prevented.

A second mode of the present invention to achieve the second object comprises, on top of the configuration of the above-mentioned first mode, a diode current detection circuit for detecting a current of the diode parallelly connected to the first resonance capacitor, and the DUTY FACTOR of the switching device stated in the first mode is made variable by the control circuit on the basis of the output of the diode current detection circuit.

According to the second mode, since the current of the switching device is suppressed by limiting the current of the diode on the basis of the detected output of the current detection circuit of the diode, the switching device is protected from the over-current and simultaneously a power loss in ON-state (ON-loss) of the switching device is further reduced.

A third mode of the present invention to achieve the third object comprises, on top of the configuration of the above-mentioned first mode, a voltage detection circuit of the first resonance capacitor for detecting the voltage of the first resonance capacitor, and the DUTY FACTOR of the switching device stated in the first mode is made variable by the control circuit on the basis of the output of the voltage detection circuit of the second resonance capacitor.

According to the third mode, since the voltage detection circuit for detecting the voltage of the first resonance capacitor is provided and the voltage of the first resonance capacitor is limited, the current of the switching device is indirectly-suppressed by an inexpensive circuit and the power loss in ON-state of the switching device can be reduced.

A fourth mode of the present invention to achieve the fourth object comprises, on top of the configuration of the above-mentioned first mode, a voltage detection circuit of the second resonance capacitor for detecting a voltage of the second resonance capacitor, and has a configuration that the DUTY FACTOR of the switching device is made variable by the control circuit on the basis of the output of the voltage detection circuit of the second resonance capacitor.

According to the fourth mode, since the voltage detection circuit for detecting the voltage of the second resonance capacitor is provided and the voltage of the second resonance capacitor is limited, the current of the switching element is indirectly suppressed by an inexpensive circuit and the power loss in ON-state of the switching device can be reduced and the switching device can be protected by an over-voltage.

A fifth mode of the present invention to achieve the fifth object comprises, on top of the configuration of the above-mentioned first mode, a voltage detection circuit of the second resonance capacitor for detecting the voltage of the second resonance capacitor, an input detection circuit for detecting an input and a determination circuit for determining an inadequate load on the basis of detected signals of the voltage detection circuit of the second resonance capacitor and the input detection circuit.

According to the fifth mode, an inadequate load can be detected by the voltage detection circuit for detecting the voltage of the second resonance capacitor and the input detection circuit for detecting the input and by comparing the voltage of the second resonance capacitor with the input of the induction heating cooker.

A sixth mode of the present invention to achieve the sixth object has, on top of the configuration of the above-mentioned first mode, such a configuration that the capacitance of the first resonance capacitor can be changed.

According to the sixth mode, since the capacitance of the first resonance capacitor is variable, the power loss of the switching device and diode can be reduced by adjusting the capacitance, and the induction heating of a high power is realizable with respect to a non-magnetic load.

A seventh mode of the present invention to achieve the seventh object comprises, on top of the configuration of the above-mentioned first mode, a current detection circuit of the diode for detecting a current of the diode and capacitance changing means for changing the capacitance of the first resonance capacitor on the basis of the detected output of the current detection circuit of the diode.

According to the seventh mode, since the current detection circuit of the diode is provided and the kind of a load is determined by detecting the current of the diode, the power loss of the switching device and the diode can be reduced by a circuit of less expense and a higher reliability, and the induction heating of a higher output is realizable with respect to the non-magnetic load.

An eighth mode of the present invention to achieve the eighth object comprises, on top of the configuration of the above-mentioned first mode, means for setting a predetermined first dead time defined as a time period from turn-OFF of the first switching device to turn-ON of the second switching device and a predetermined second dead time defined as a time period from turn-OFF of the second switching device to turn-ON of the first switching device which is different from the first dead time.

According to the eighth mode, the first dead time defined as the time period from turn-OFF of the first switching device to turn-ON of the second switching device and the second dead time defined as the time period from turn-OFF of the second switching device to turn-ON of the first switching device are set different from each other. And these dead times are set to the respective optimum values in the respective condition of design. Consequently, the turn-ON operation of the switching device in the case of the DUTY FACTOR $T_2/T_1 \ll 0.5$ is optimized, and noise and a power loss of the switching device can be reduced.

A ninth mode of the present invention to achieve the ninth object comprises, on top of the configuration of the above-mentioned first mode, the voltage detection circuit of the second resonance capacitor for detecting a voltage of the second resonance capacitor, and in the case that the output of the voltage detection circuit of the second resonance capacitor is a predetermined value and below, both the switching devices are controlled so that operation or suspension of the switching devices is alternately repeated by the control circuit, and the input is controlled by changing a time period ratio of a time period of the operation state to a time period of the suspension state.

According to the ninth mode, the voltage detection circuit of the second resonance capacitor is provided to detect the voltage of the second resonance capacitor, and an operation state of the inverter is detected by the magnitude of the voltage of the second resonance capacitor. In the case that the output of the voltage detection circuit of the second resonance capacitor is a predetermined value and below, a ratio of the time period of oscillation to the time period of suspension of the oscillation is varied and thereby the input is controlled. Namely, since "DUTY control" (hereinafter is referred to as DUTY) is performed, the voltage generated in turn-ON operation of the first switching device in the case of the DUTY FACTOR $T_2/T_1 \ll 0.5$ can be limited to an arbitrary value and below, and the noise and the power loss in the switching device can be further reduced.

A tenth mode of the present invention to achieve the above-mentioned ninth object comprises, on top of the configuration of the above-mentioned first mode, an input setting circuit of which an operator can set an input, in the case that the input set by the operator is a predetermined value and below, the operation or the suspension of the switching device is alternately repeated by the control circuit, and the input is controlled by changing the time period ratio of the time period of the operation state to the time period of the suspension state.

According to the tenth mode, in the case that the input value set by the user is a predetermined value and below, the input of the heating coil is controlled by changing a ratio of a time period of oscillation to a time period of suspension of the oscillation. Namely, the DUTY control is performed. Consequently, the voltage which is generated in turn-ON operation of the first switching device in a small input can be limited to no greater than a given value and below, and thus the noise and the power loss in the switching device is further reduced.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 2A is a diagram representing waveforms in operation of the induction heating cooker in the condition of an DUTY FACTOR $T_2/T_1 \ll 0.5$;

FIG. 2B is a diagram representing waveforms in the operation of the induction heating cooker in the condition of DUTY FACTOR $T_2/T_1 \approx 0.5$;

It will be recognized that some or all of the Figures are schematic representations for purposes of illustration and do not necessarily depict the actual relative sizes or locations of the elements shown.

PREFERRED EMBODIMENT OF PRESENT INVENTION

[First embodiment]

Figure 1:
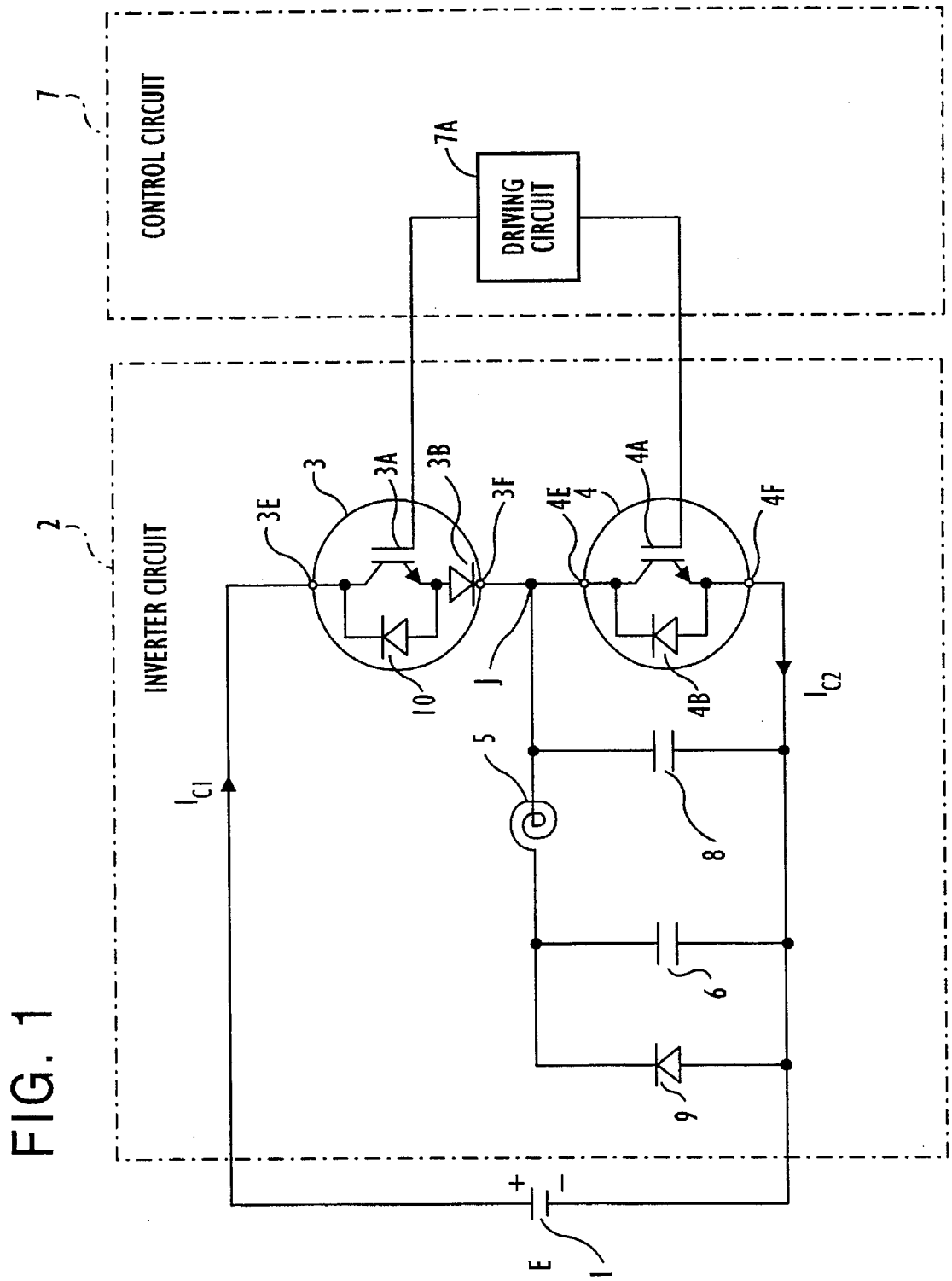
FIG. 1 is a circuit diagram of the induction heating cooker of a first embodiment of the present invention.

FIG. 1 is a circuit diagram of the induction heating cooker of a first embodiment of the present invention. Referring to FIG. 1, in an inverter circuit 2, a first switching device 3 of a reverse current blocking type comprises an insulated gate bipolar transistor (hereinafter is referred to as IGBT) 3A as a switching element and a diode 3B for blocking a reverse current connected in series to the IGBT 3A. A diode 10 for conducting a reverse current is connected across the collector and the emitter of the IGBT 3A.

A second switching device 4 of a reverse current conductive type is connected in series to the first switching device 3. The second switching device 4 comprises an IGBT 4A, and a diode 4B for conducting a reverse current connected across the collector and the emitter of the IGBT 4A. The switching devices 3 and 4 connected in series are coupled to a direct current source 1 of a voltage E.

One of two terminals of a heating coil 5 is connected to a junction J of a terminal 3F of the switching device 3 and a terminal 4E of the switching device 4. The other terminal of the heating coil 5 is connected to a negative terminal of the direct current source 1 through a first resonance capacitor 6. A diode 9 is parallelly coupled to the first resonance capacitor 6 so as to be connected to the negative terminal of the direct current source 1 at the anode. A second resonance capacitor 8 is connected across the junction J of the switching devices 3 and 4 and the negative terminal of the direct current source 1.

A control circuit 7 for controlling the inverter circuit 2 comprises a driving circuit 7A for applying driving signals to the switching devices 3 and 4.

FIG. 2A and FIG. 2B are diagrams representing waveforms in operation of the switching devices 3 and 4 in the case that a DUTY FACTOR $T_2/T_1$ (which is defined as a ratio of a time period $T_2$ in conduction state of the first switching device 3 to a period $T_1$ of an oscillation signal) is smaller than 0.5 (hereinafter is referred to as "$T_2/T_1 << 0.5$") and in the case that the DUTY FACTOR $T_2/T_1$ is approximately 0.5 (hereinafter is referred to as "$T_2/T_1 \approx 0.5$"), respectively. Waveforms $V_{CE1}$ and $V_{CE2}$ represent voltages across both terminals 3E and 3F of the switching device 3 and a voltage across both terminals 4E and 4F of the switching device 4, respectively. Waveforms $I_{C1}$ and $I_{C2}$ represent currents of the switching devices 3 and 4, respectively. Waveforms $V_{CE1} \times I_{C1}$ and $V_{CE2} \times I_{C2}$ represent power losses in the switching devices 3 and 4, respectively. In FIG. 2A and FIG. 2B, hatched parts H of their waveforms $I_{C2}$, represent conducting periods of the diode 9. Moreover, a period between times $t_{10}$ and $t_{11}$ represents the period generating an ON-state loss, and a period between times $t_{11}$ and $t_{12}$ represents the period generating a switching loss.

Figure 2C:
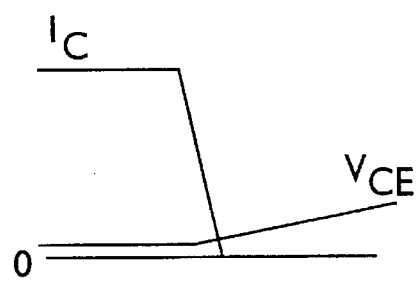
FIG. 2C is a diagram representing enlarged waveforms of a current and a voltage of a switching device.

FIG. 2C is a diagram of an enlarged waveform in "turn-OFF operation" of the switching device 3 or 4. The turn-OFF operation represents to disconnect the switching device 3 or 4 in the state that a current $I_C$ is more than zero ($I_C > 0$).

Figure 2D:
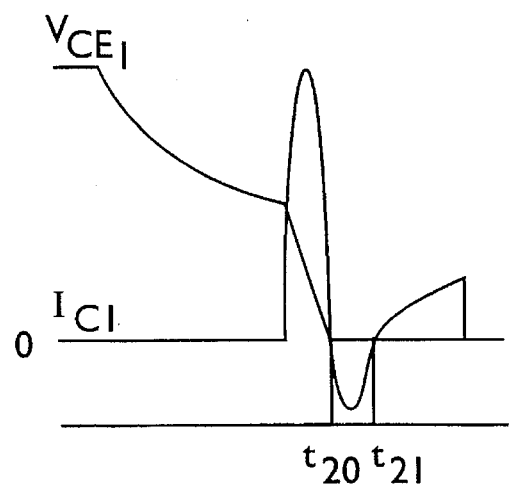
FIG. 2D is a diagram representing enlarged waveforms of a voltage and a current of a first switching device.

FIG. 2D is a diagram of an enlarged waveform in "turn-ON operation" of the switching device 3 in the case of DUTY FACTOR $T_2/T_1 << 0.5$. The turn ON operation represents to close the switching device 3 or 4 in the state that a voltage $V_{CE}$ is more than zero ($V_{CE} > 0$).

Figure 3:
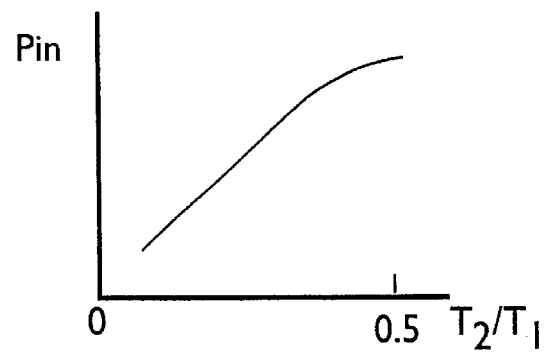
FIG. 3 is a diagram of relation of an input power $P_{in}$ versus the DUTY FACTOR $T_2/T_1$.

FIG. 3 is a diagram representing a relation of the DUTY FACTOR $T_2/T_1$ (graduated on abscissa) versus an input power $P_{in}$ of the induction heating cooker (graduated on ordinate). As shown in FIG. 3, the DUTY FACTOR $T_2/T_1$ is approximately proportional to the input power $P_{in}$ within a range from 0 to 0.5 of the DUTY FACTOR $T_2/T_1$.

As shown in FIG. 2A, FIG. 2B and FIG. 3, the switching device 3 and the switching device 4 are alternately activated by the driving circuit 7A, and the input power $P_{in}$ is controlled by changing the DUTY FACTOR $T_2/T_1$. The inverter circuit 2 of the first embodiment has a resonance mode of the heating coil 5 and the first resonance capacitor 6 and a resonance mode of the heating coil 5 and the second resonance capacitor 8.

When a current passes through the switching device 3 or the switching device 4, the resonance mode of the heating coil 5 and the resonance capacitor 6 is formed. (In a period that a current passes the diode 9, a circulation current is generated through the diode 9, the heating coil 5, the switching device 4 and the diode 9). The resonance mode of the heating coil 5 and the resonance capacitor 8 is formed in a period of a dead time from turn-OFF of the switching device 3 or the switching device 4 to commencement of passing of a current in other switching device (a time period between a time $t_2$ and a time $t_3$ and a time period between a time $t_4$ and a time $t_5$ in FIG. 2A).

As shown in FIG. 2C, a voltage variation ($dV_{CE}/dt$) at the turn-OFF operation is reduced by connecting in parallel the resonance capacitor 8 to the switching device 4, and a power loss in the turn-OFF operation represented by the product of the voltage by the current ($V_{CE} \times I_C$) is greatly reduced.

In the case of the DUTY FACTOR $T_2/T_1 \approx 0.5$, as shown in FIG. 2B, the switching device 3 turns ON in a period of $V_{CE1} < 0$, and the switching device 4 turns ON in a period of $VCE_2 = 0$ (a time period in which a current passes the diode 4B for conducting a reverse current of the switching device 4). Consequently, no turn-ON operation occurs. The turn-ON operation occurs without fail with respect to the current $I_{C2}$ by operation of the diode 9. Furthermore, the heating coil 5 and the resonance capacitor 8 resonate, the voltage $V_{CE2}$ rises, and the voltage $V_{CE1}$ becomes negative values ($V_{CE1} = E - V_{CE2}$). Therefore the turn-ON operation does not occur with respect to the current $I_{C1}$. Consequently, a "zero-voltage-switching operation" of the switching device 3 is performed in a wide range of a load. The zero-voltage-switching operation represents a switching operation in the state that a voltage is not applied across the collector and emitter of the switching element of the switching device 3 or 4.

In the case of the DUTY FACTOR $T_2/T_1 << 0.5$, the current of the heating coil 5 is reduced, and a resonance voltage of the resonance capacitor 8 which is charged after turn-OFF of the switching device 4 does not reach to the voltage E of the direct current source 1. As shown in FIG. 2A, when the switching device 3 turns ON, the voltage $V_{CE1}$ is larger than zero ($V_{CE1} = E - V_{CE2} > 0$), and the turn-ON operation occurs. At this time, an operation mode which short-circuits the resonance capacitor 8 occurs, and a short-circuit current is generated through the loop formed by the direct current source 1, the switching device 3, the resonance capacitor 8 and the direct current source 1. The short-circuit current resonates in an inductance component of the wiring of the loop and the resonance capacitor 8, and as shown in FIG. 2D, a current passes in the reverse direction of the switching device 3 during a reverse recovery time ($t_{20} - t_{21}$) of the reverse current blocking diode 3B. The current in the reverse direction passes through the diode 10 for conducting a reverse current connected across the collector and emitter of the IGBT 3A. Therefore, the current does not pass in the reverse direction of the IGBT 3A as in the conventional case and a reverse direction breakdown of the IGBT 3A does not occur.

According to the first embodiment, the turn-ON operation of the switching devices 3 and 4 does not occur in normal operation of the DUTY FACTOR $T_2/T_1 \approx 0.5$ by providing the resonance capacitors 6 and 8 and connecting the diode 9 in parallel to the resonance capacitor 6, and a switching loss in turn-OFF operation is also greatly reduced. Moreover, since the voltage variations ($dV_{CE}/dt$) across both the terminals of the switching devices 3 and 4 are made gentle, noise is greatly reduced. Furthermore, since the diode 10 for conducting the reverse current is connected in parallel to the IGBT 3A of the switching device 3, even if the turn-ON operation occurs in the switching device 3 in the state of the DUTY FACTOR $T_2/T_1 \ll 0.5$ and the operation mode short-circuiting the resonance capacitor 8 occurs, the current passing through the switching device 3 in the reverse direction passes the diode 10 coupled in parallel to the IGBT 3A. Consequently, reverse directional breakdown of the IGBT 3A is prevented and the reliability of the IGBT 3A can be improved.

Figure 4A:
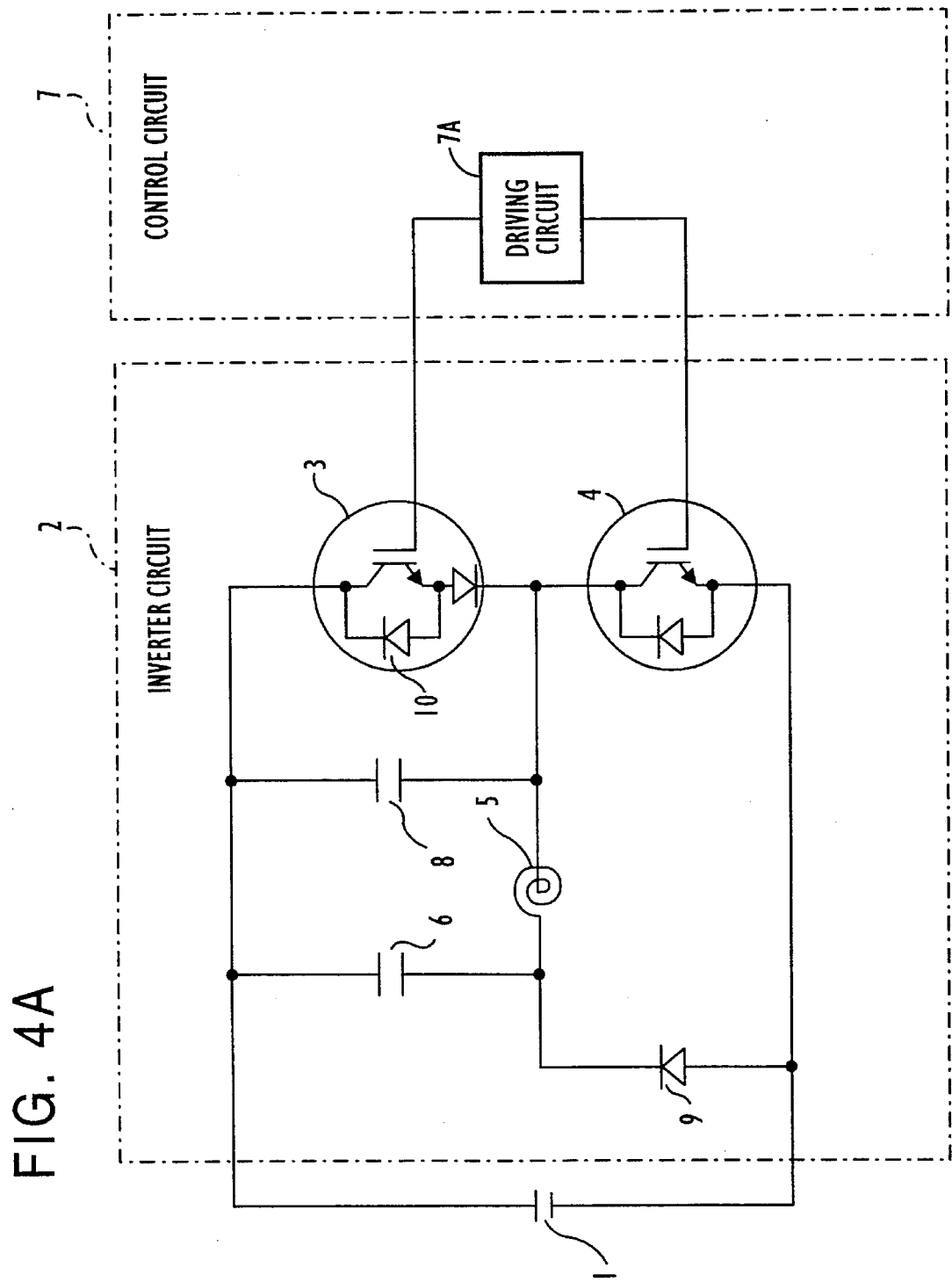
FIG. 4A is a circuit diagram of another example of the first embodiment.
Figure 4B:
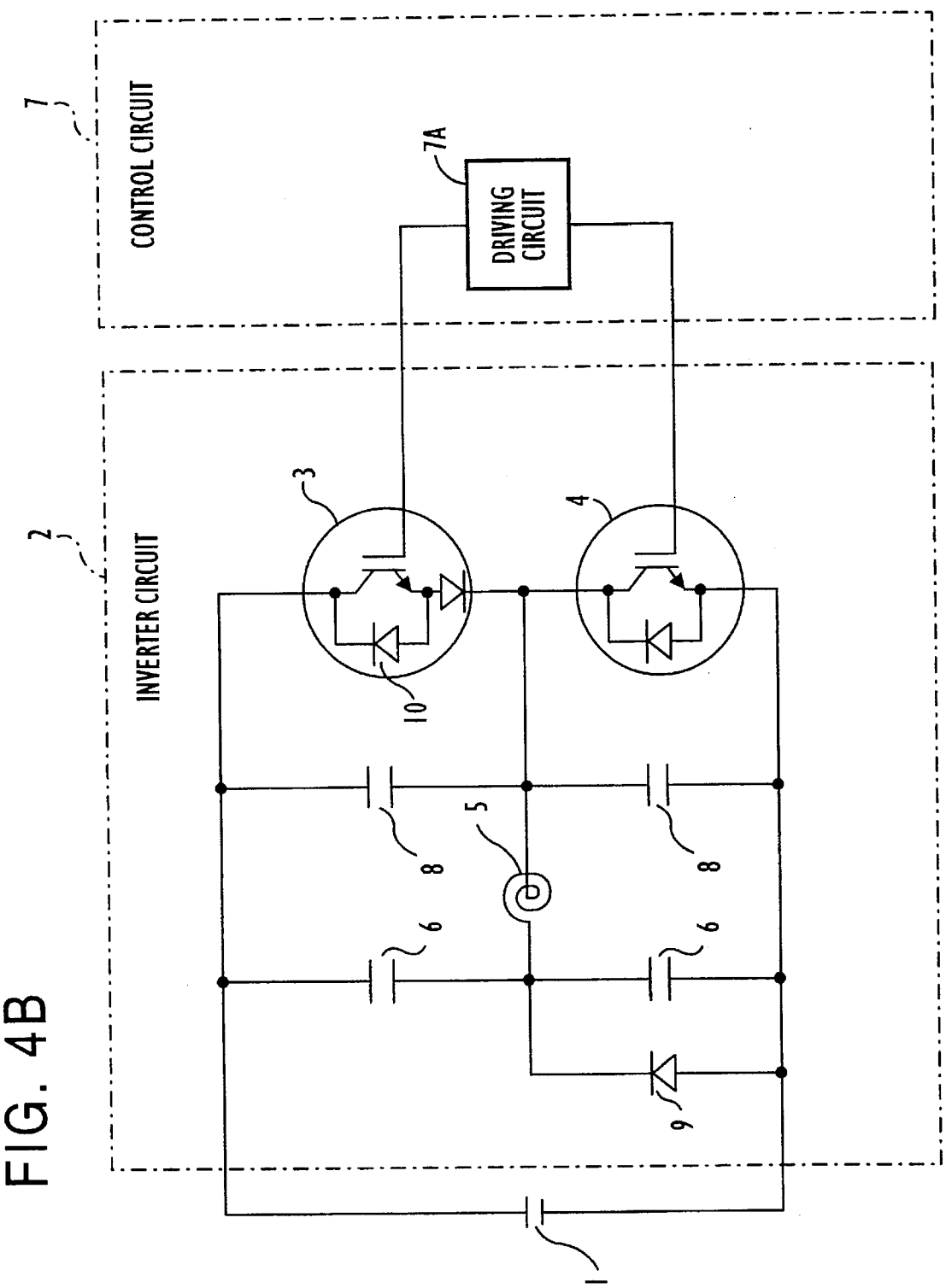
FIG. 4B is a circuit diagram of further example of the first embodiment.

Incidentally, the resonance capacitors 6 and 8 can be connected across the positive terminal of the direct current source 1 and both terminals of the heating coil 5 as shown in FIG. 4A. Furthermore, as shown in FIG. 4B, two pairs of the resonance capacitors 6 and 8 can be connected across the positive terminal of the direct power source 1 and both terminals of the heating coil 5 and across the negative terminal of the direct current source 1 and both terminals of the heating coil 5. The operation of the resonance capacitors 6 and 8 are similar to the above-mentioned both connections. In the connection as shown in FIG. 4B, when the voltage of the direct current source 1 suddenly increases by an abnormal state of the power source such as surge due to thunderbolt, the voltage of the direct current source 1 is divided by the capacitors 6 and 8 and the voltage which is applied to the switching devices 3 and 4 is equalized. Consequently, there is an effect that protection to an overvoltage is realizable. The above-mentioned circuit configurations can be combined to form an inverter circuit.

Figure 5:
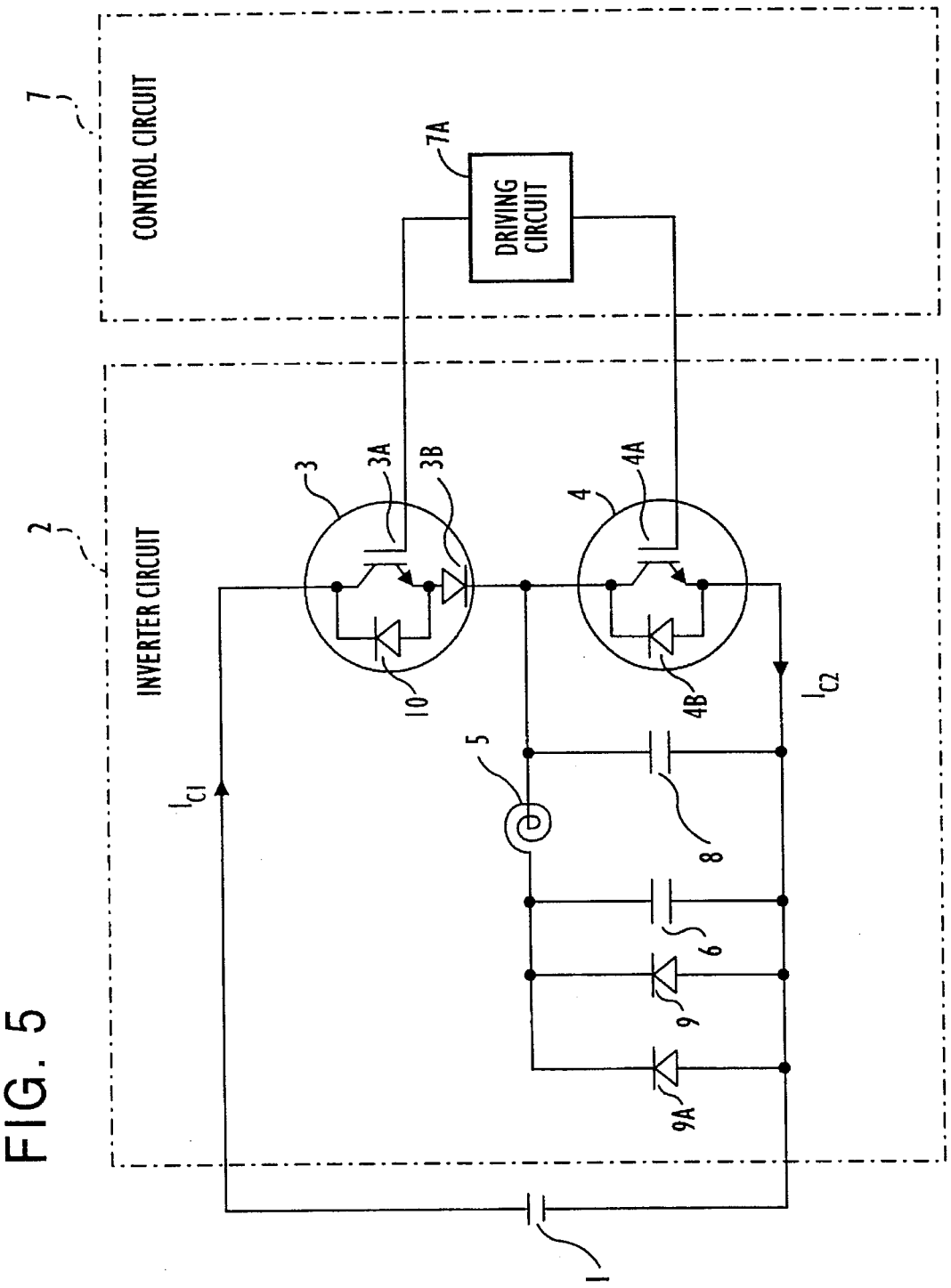
FIG. 5 is a circuit diagram of still further example of the first embodiment.

Moreover, the same effect is obtainable by connecting in parallel another diode 9A to the diode 9 as shown in FIG. 5. Furthermore, plural diodes 9A (not shown) can be connected in parallel to the diode 9. In this case, since the current passes through the diodes 9 and 9A, a power loss is shared by two diodes 9 and 9A. Consequently, there is an effect that designing of cooling means for the diode 9 is simplified.

As mentioned above, in the induction heating cooker of the first embodiment, the inverter circuit comprises the first switching device of the reverse current blocking type and the second switching device of the reverse current conducting type, the first resonance capacitor and the second resonance capacitor, and the first and second switching devices are alternately made conductive at a constant frequency. Moreover, the first and second switching devices are controlled by the control circuit comprising the driving circuit which is capable of varying the DUTY FACTOR. Since the diode for conducting the reverse current is coupled across the collector and the emitter of the switching element of the switching device, turn-ON operation does not occur in the switching device in a normal operation. Furthermore, the voltage in the turn-OFF operation is reduced, and a switching loss and noise of the switching devices are greatly reduced. Moreover, even in the case that the turn-ON operation occurs in the first switching device by a load condition, a short-circuit mode of the second resonance capacitor occurs and a current in the reverse direction passes the first switching device, the current in the reverse direction of the first switching device passes the diode for conducting the reverse current. Therefore, break down in the reverse direction of the first switching device is prevented, and reliability of the switching devices can be improved.

[Second embodiment]

Figure 6:
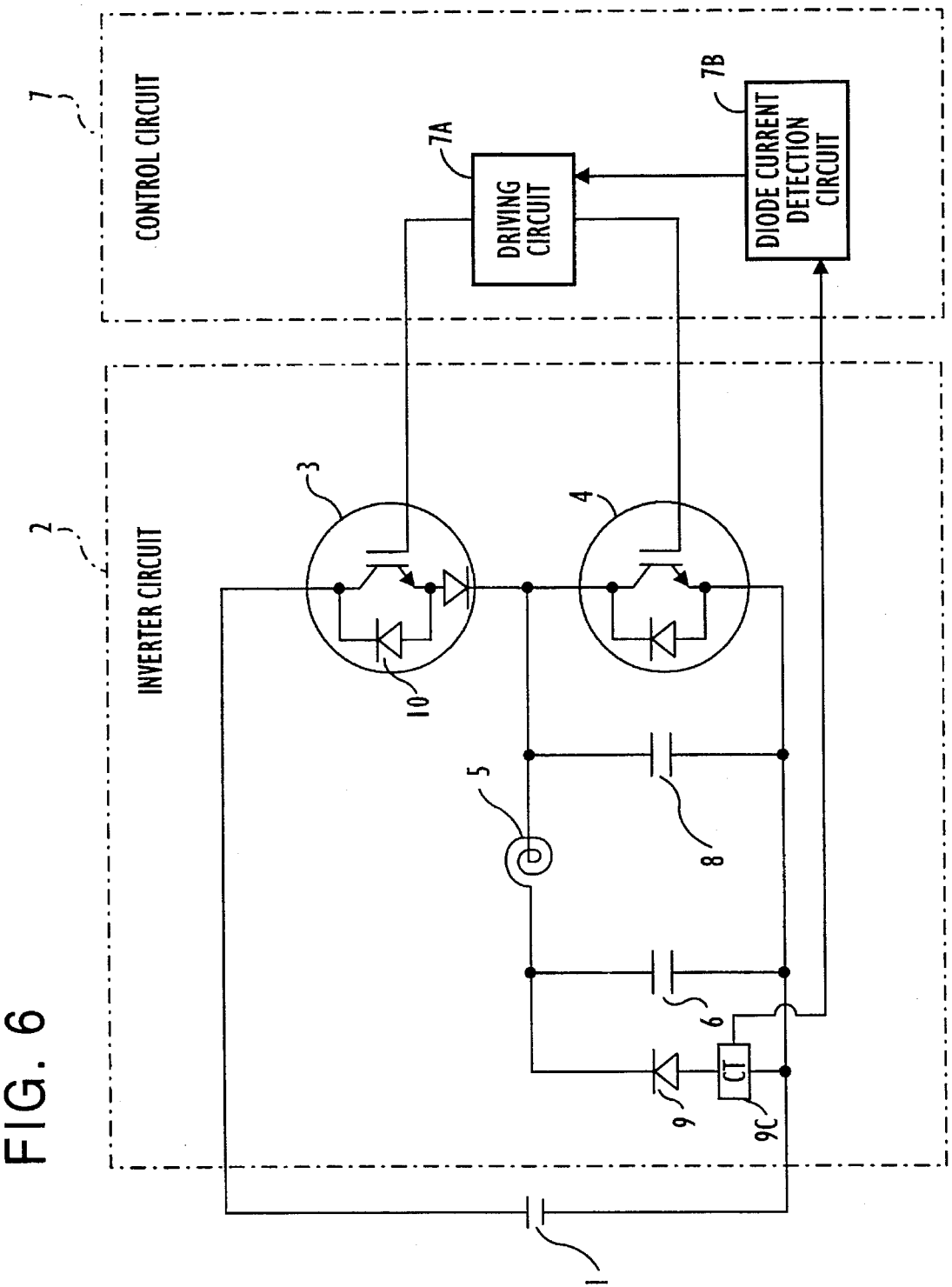
FIG. 6 is a circuit diagram of the induction heating cooker of a second embodiment of the present invention.

FIG. 6 is a circuit diagram of the second embodiment of the present invention. Referring to FIG. 6, a current detector such as a current transformer 9C for detecting a current of the diode 9 is provided in the inverter circuit 2. A diode current detection circuit 7B is provided in the control circuit 7 to detect the current of the diode 9. It is to be noted that like parts in FIG. 6 are designated by like reference numerals in FIG. 1. The operation of the inverter circuit 2 in FIG. 6 is substantially similar to that of the inverter circuit 2 in FIG. 1. Since the voltage variation ($dV_{CE}/dt$) in turn-OFF operation is reduced and a power loss in the turn-OFF operation, namely the product of a voltage by a current ($V_{CE} \times I_C$), is greatly reduced by coupling the resonance capacitor 8 in parallel to the switching device 4, the losses of two switching devices 3 and 4 are only an ON-state loss (the product of a voltage by a current in ON-state ($V_{CE} \times I_C$)). Therefore, if the currents passing through two switching devices 3 and 4 are reduced, the losses of the switching devices 3 and 4 are further reduced. In general, designing of the induction heating cooker is based on a standard load (pan, for example) of a predetermined size and material. Therefore, when a load which is smaller in size than the standard load or a non-magnetic load is used, the current passing through the switching device is liable to exceed an originally designed value. The second embodiment purposes to limit the current of the switching device on the basis of the detected value of the diode 9.

The currents passing through two switching devices 3 and 4 can be directly detected by using a current transformer for large current, and a current can be limited on the basis of the detected current. However, the current transformer for large current is large and expensive. In the second embodiment, attention is paid to that the peak value of the current passing through the switching device 4 is approximately equal to the peak value of the current passing through the diode 9. The current of the diode 9 is detected by the diode current detection circuit 7B through the current transformer 9C, and the peak value of the current is limited on the basis of the detected value of the diode current detection circuit 7B, and thereby the currents passing through respective switching devices 3 and 4 are limited.

An effective value of the current passing through the diode 9 is much smaller than that passing through the switching device 4. Therefore, the current of the diode 9 can be detected by the current transformer 9C for a small current which is inexpensive, because the cost of the current transformer depends on the effective value of the current. Though the current passing through the switching device 3 is not directly limited, the current of the switching device 3 is indirectly limited, because the current passing through the switching device 3 correlates with the current passing through the switching device 4.

According to the second embodiment, the power losses of two switching devices 3 and 4 can be further decreased by limiting the current on the basis of the detected current of the diode 9. Moreover, protection for an over-current of the switching devices 3 and 4 is also realized.

[Third embodiment]

Figure 7:
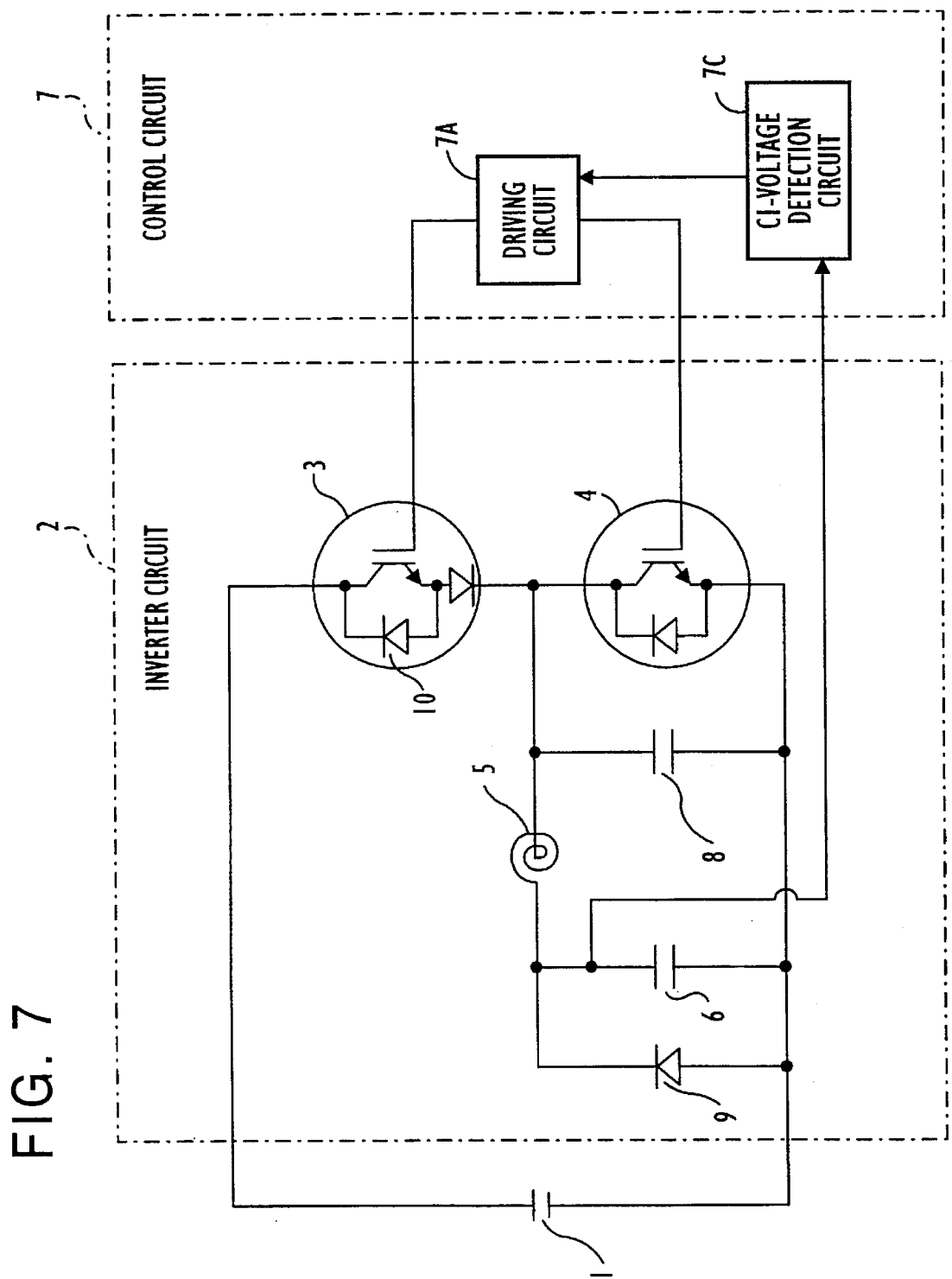
FIG. 7 is a circuit diagram of the induction heating cooker of a third embodiment of the present invention.

FIG. 7 is a circuit diagram of the third embodiment of the present invention. Referring to FIG. 7, a C1-voltage detection circuit 7C for detecting the voltage of the first resonance capacitor 6 is provided in the control circuit 7. It is to be noted that like parts in FIG. 7 are designated by like reference numerals in FIG. 1.

The inverter circuit 2 in FIG. 7 is substantially identical with that of the first embodiment as shown in FIG. 1, and the operation is also the same. The voltage variation ($dV_{CE}/dt$) in the turn-OFF operation is reduced by coupling the resonance capacitor 8 in parallel to the switching device 4 and thus the loss in the turn-OFF operation, namely the product of a voltage by a current ($V_{CE} \times I_C$), is greatly reduced. Therefore, the losses in two switching devices 3 and 4 are only an ON-state loss (the product of the voltage by the current in ON-state ($V_{CE} \times I_C$)).

Therefore, if the currents passing through two switching devices 3 and 4 are reduced in a manner similar to the second embodiment, the loss can be further reduced.

In the operation of the inverter circuit 2, current is made to pass through the two switching devices 3 and 4, and charging in and discharging from the resonance capacitor 6 is repeated through the heating coil 5, and therefore, equation (1) holds except for a period of which a current passes the diode 9.

$$I_L = C1 \times (dV_{C1}/dt) \qquad (1),$$

where, "$I_L$" designates a current passing through the heating coil 5, namely the current $I_L$ is equal to the currents passing through two switching devices 3 and 4. "C1" designates a capacitance of the resonance capacitor 6, and ($dV_{C1}/dt$) designates a voltage variation of the resonance capacitor 6 per an unit time. As mentioned above, the voltage of the resonance capacitor 6 varies corresponding to the current which is charged or discharged. Consequently, by detecting an amplitude of the resonance capacitor 6, outline of currents passing through respective switching devices 3 and 4 are detected.

Referring to FIG. 7, an amplitude of the voltage of the resonance capacitor 6 is detected by the C1-voltage detection circuit 7C, and the amplitude of the voltage is limited to a predetermined value. Consequently, the currents passing through respective switching devices 3 and 4 are indirectly limited, and the power losses are reduced. The voltage can be detected by a resister or the like, the C1-voltage detection circuit 7C can be formed by an inexpensive circuit. In actual circuit, a peak-hold circuit composed of a resister and a capacitor is usable to detect the voltage. According to the third embodiment, the power losses of the switching devices 3 and 4 are further reduced by using the inexpensive circuit which detects the amplitude of voltage of the resonance capacitor 6.

[Fourth embodiment]

Figure 8:
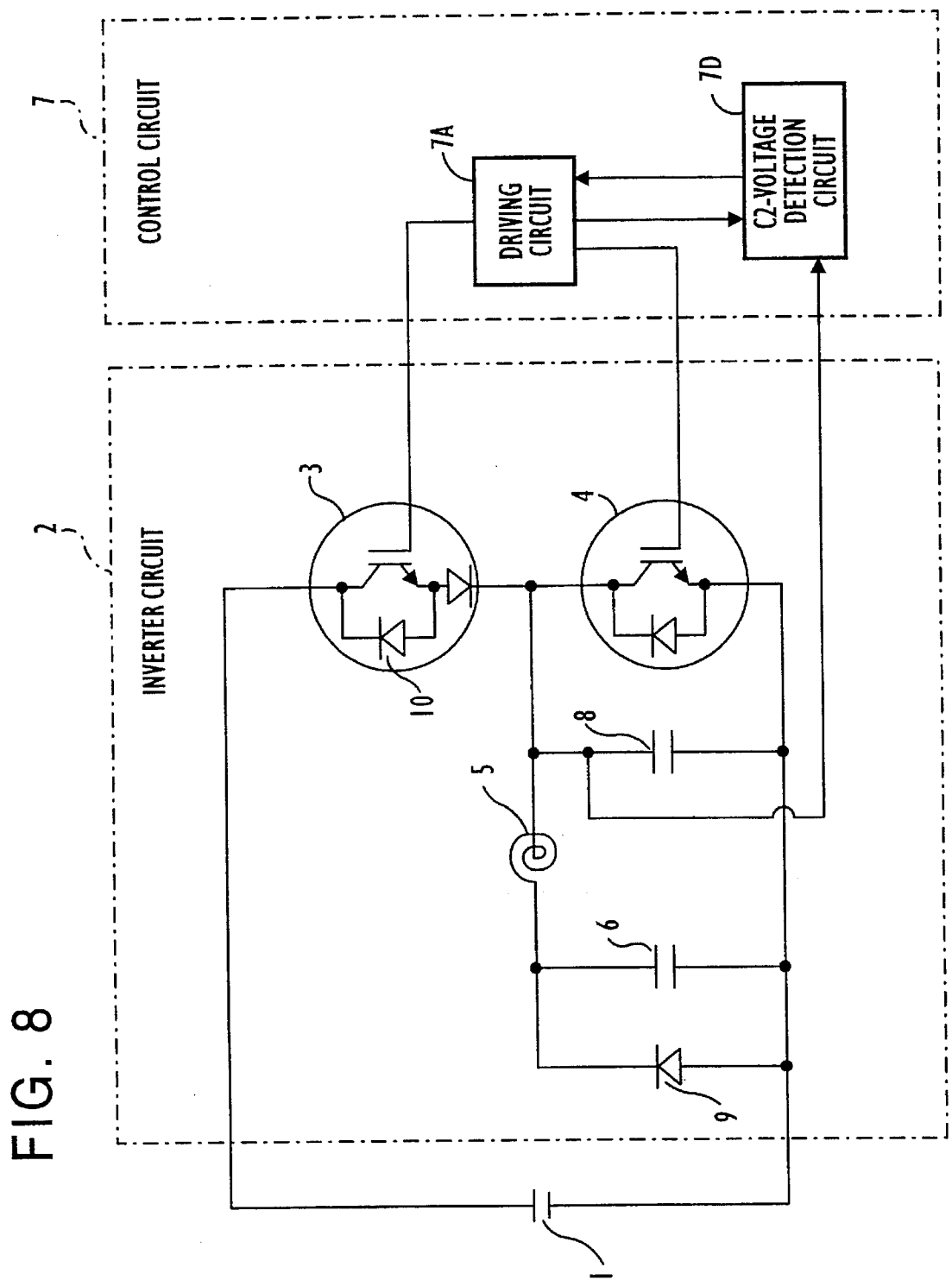
FIG. 8 is a circuit diagram of the induction heating cooker of a fourth embodiment of the present invention.

FIG. 8 is a circuit diagram of the fourth embodiment of the present invention. Referring to FIG. 8, a C2-voltage detection circuit 7D for detecting a peak voltage of the resonance capacitor 8 is disposed in the control circuit 7. It is to be noted that like parts in FIG. 8 are designated by like reference numerals in FIG. 1.

The operation of the inverter circuit 2 is substantially identical with that in the first embodiment. Provided that an energy given to a load such as a pan is disregarded, a relation represented by equation 2 holds between the turn-OFF current $I_{C2TF}$ and the peak voltage $V_{CE2P}$ of the switching device 4 by the principle of the conservation of energy.

$$L \times (I_{C2TF}) \times (I_{C2TF}) = C2 \times (V_{CE2P}) \times (V_{CE2P}) \qquad (2),$$

where, "L" designates an equivalent inductance of the heating coil 5 and the pan or the like, and "C2" designates a capacitance of the resonance capacitor 8.

Moreover, the current starts to pass the diode 9 from a value of which the current passing through the switching device 4 becomes substantially a peak value, and a circulation current passes from diode 9 to the switching device 4 through the heating coil 5. Decrement of the circulation current is represented by equation 3.

$$I_{C2}(t) = I_{C2P} \times (1 - e^{-(Rt/2L)}) \qquad (3),$$

where, "R" designates a equivalent resistance of the heating coil 5 and the pan or the like. Moreover, "$I_{C2}(t)$" designates a current value of the switching device 4 after a time t from a point of time at which the current passing through the switching device 4 becomes the peak value. "$I_{C2P}$" designates the peak value of the current of the switching device 4. Consequently, in the case that the peak voltage $V_{CE2P}$ is detected and is corrected on the basis of the time t, the current of the switching device 4 is approximately detected, and the current of the switching device 3 is also approximately detected in a manner similar to the second embodiment.

Figure 9:
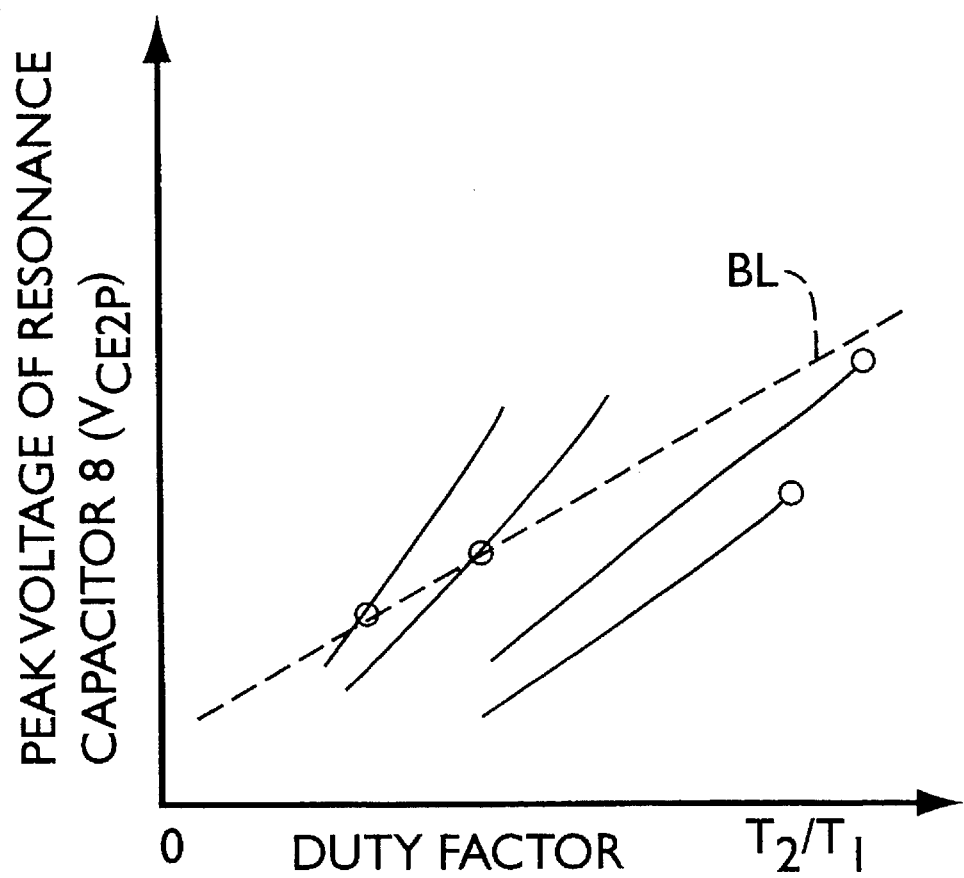
FIG. 9 is a diagram representing relation of a voltage of a second resonance capacitor (Peak voltage) versus the DUTY FACTOR of the switching device in the fourth embodiment.

In the fourth embodiment, instead of detection of a time period from the peak of current of the switching device 4 to the turn-OFF, a relation between the DUTY FACTOR $T_2/T_1$ and the peak voltage $V_{CE2P}$ of the resonance capacitor 8 is derived as shown in FIG. 9. Small circles attached at respective upper ends of curves represent relation of the peak voltage $V_{CE2P}$ and the DUTY FACTOR $T_2/T_1$ in a maximum input of the induction heating cooker. Small circles attached on respective midway parts of curves represent relation of the peak voltage $V_{CE2P}$ and the DUTY FACTOR at which the peak voltage is limited. The voltage is limited on the basis of the peak voltage $V_{CE2P}$ which is corrected by the DUTY FACTOR $T_2/T_1$, because a time period from a point of time of the peak current to the point of time of the turn-OFF substantially depends on the DUTY FACTOR. Though there is an influence by a kind of a load such as a magnetic load or a non-magnetic load, it is apparent that the larger the DUTY FACTOR becomes, the shorter a time period from the point of time of peak current to the point of time of the turn-OFF becomes.

According to the fourth embodiment as mentioned above, the voltage of the second resonance capacitor 8 is limited by detecting the peak voltage of the resonance capacitor 8 and correcting on the basis of the DUTY FACTOR. Consequently, the currents of two switching devices 3 and 4 are indirectly suppressed and the ON-state loss is reduced and protection against overvoltage of the switching devices 3 and 4 are also realized.

[Fifth embodiment]

Figure 10:
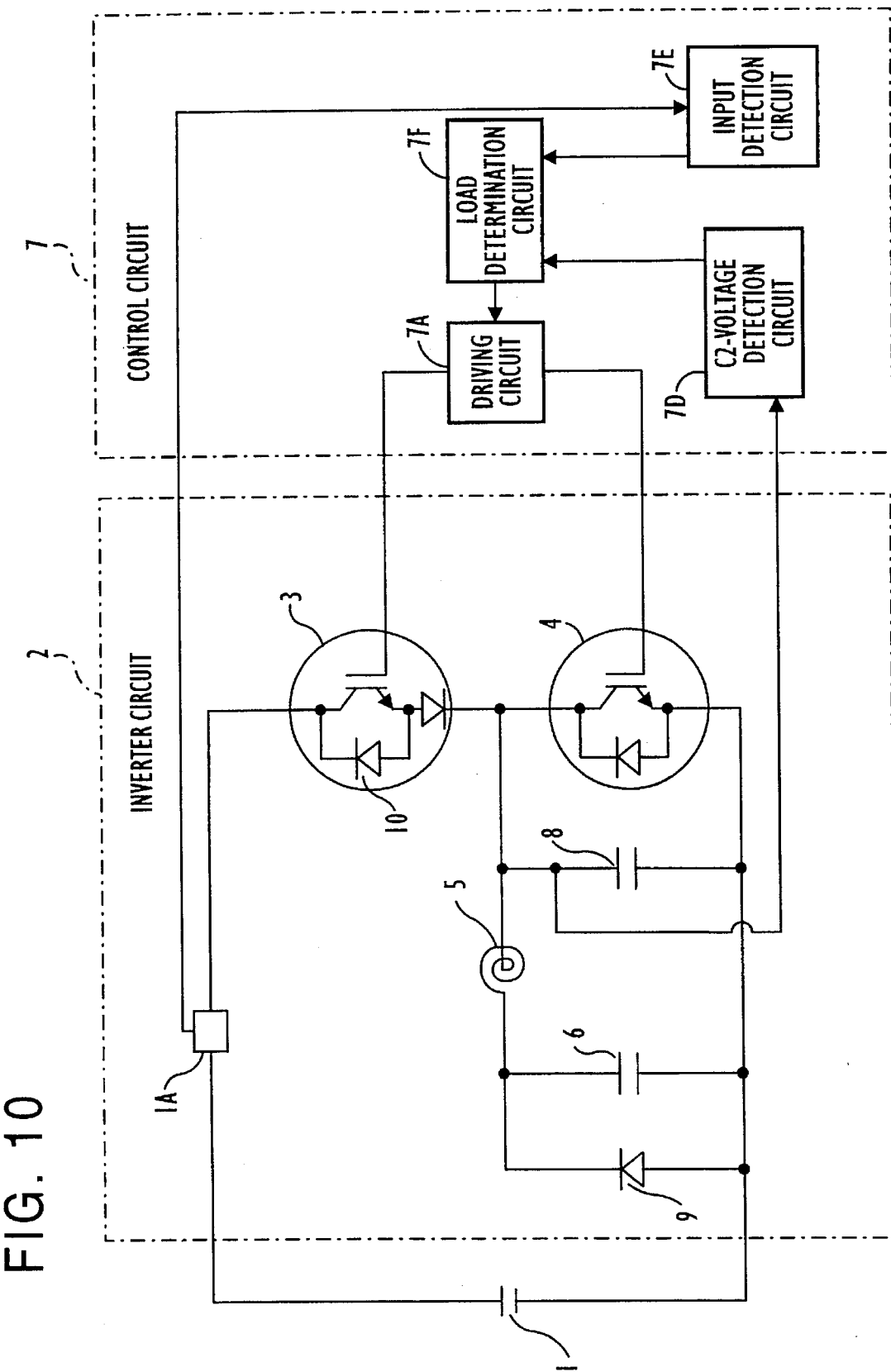
FIG. 10 is a circuit diagram of the induction heating cooker of a fifth embodiment of the present invention.

FIG. 10 is a circuit diagram of the fifth embodiment of the present invention. Referring to FIG. 10, the control circuit 7 comprises a C2-voltage detection circuit 7D for detecting peak voltage of the resonance capacitor 8, an input detection circuit 7E for detecting an input from a detected output of an input sensor 1A and a load determination circuit 7F for outputting a signal for suspending heating operation by the driving circuit 7A by comparing the outputs of the C2 voltage detection circuit 7D and the output of the input detection circuit 7E. It is to be noted that like parts in FIG. 10 are designated by like reference numerals in FIG. 1.

The configuration and operation of the inverter circuit 2 is substantially identical with those of the first embodiment. As described in the fourth embodiment, provided that an energy given to the load such as a pan is disregarded, the relation between the turn-OFF current $I_{C2TF}$ and the peak voltage $V_{CE2P}$ of the switching device 4 is represented by equation 2. An energy $P_{R1}$ given to the load is considered in the equation 2, and the following equation (4) is derived;

$$L \times (I_{C2TF})(I_{C2TF}) = C2 \times (V_{CE2P}) \times (V_{CE2P}) + P_{R1} \qquad (4).$$

Therefore, even if the turn-OFF current $I_{C2TF}$ is the same, when the equivalent resistance of the load is reduced, the energy $P_{R1}$ is reduced, and the peak voltage $V_{CE2P}$ increases.

In equation (3), in the case that the equivalent resistance R of the load is small, the term of "$e^{-(Rt/2L)}$" representing decrement of the circulation current decreases. Namely, even if the current $I_{C2P}$ is the same, when the equivalent resistance value R of the load is reduced, the current $I_{C2}(t)$ increases. Consequently, when the equivalent resistance R of the load decreases, the voltage $V_{CE2P}$ increases.

Subsequently, a relation between the input power and the current $I_t$ passing through the heating coil 5 is represented by the following equation (5), because the input power $P_{in}$ becomes equal to a power $P_R$ supplied to the load when the loss in the inverter circuit 2 or the like is disregarded.

$$P_{in} = P_R = \frac{1}{t_5 - t_2} \int_{t_2}^{t_5} R \times I_L(t) \times I_L(t) dt, \quad (5)$$

Therefore, in the same input power, the smaller the equivalent resistance R of the load becomes, the larger the current $I_L$ passing through the heating coil 5, namely the current $I_{C2P}$, becomes.

Figure 11:
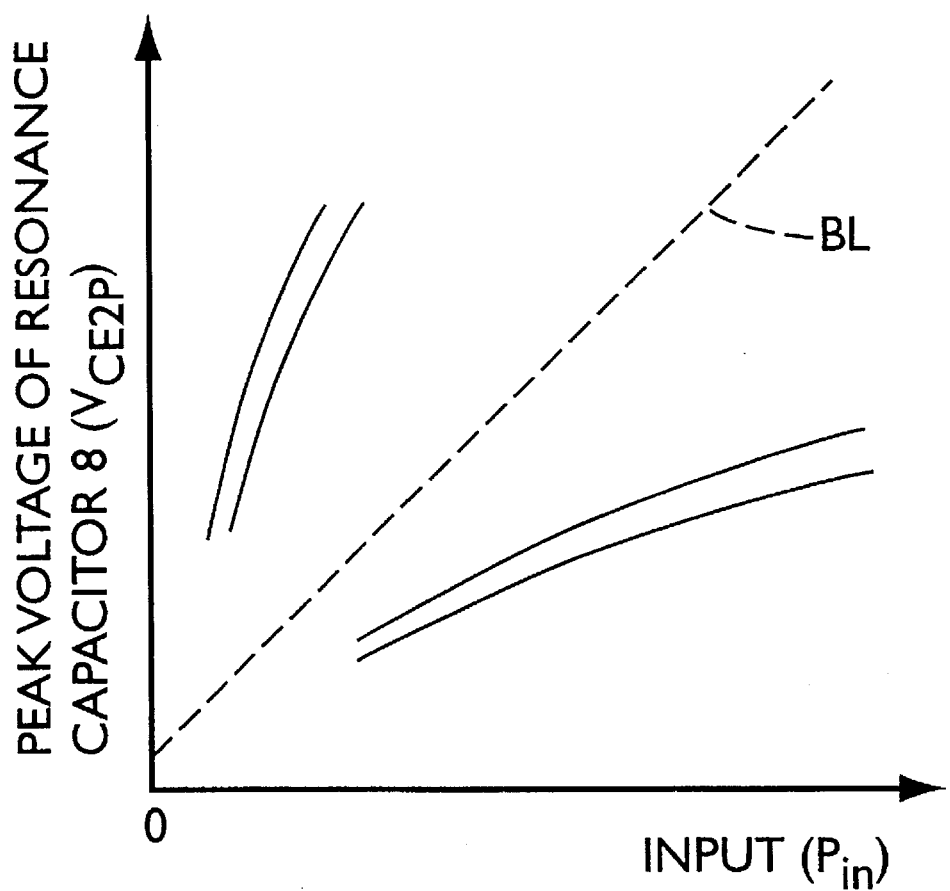
FIG. 11 is a diagram representing relation of the voltage of the second resonance capacitor versus an input of the induction heating cooker.

By the above-mentioned characteristic, a relation between the input power $P_{in}$ and the voltage $V_{CE2P}$ (peak voltage) of the resonance capacitor 8 is represented by FIG. 11. Namely, even for the same input power $P_{in}$, the voltage $V_{CE2P}$ (peak voltage) of the second capacitor 8 is large in the case of an inadequate load such as a knife or an aluminum pan which has a small equivalent resistance, and is small in the case of a load having a large equivalent resistance such as a porcelain enameled pan. The input power $P_{in}$ and the voltage $V_{CE2P}$ are compared in the load determination circuit 7F, and when a point represented by both values in FIG. 11 is located in a left-upper area from an oblique broken line BL, the load is determined to be an inadequate load. On the other hand, when the point is located in an right-lower area from the broken line BL, the load is determined to be an adequate load. In the case of the inadequate load, a signal for suspending the heating operation is applied to the driving circuit 7A.

According to the fifth embodiment, the input and the peak voltage of the resonance capacitor 8 are detected and the inadequate load is determined by the load determination circuit 7F as shown in FIG. 11, and the heating operation can be suspended.

[Sixth embodiment]

Figure 12:
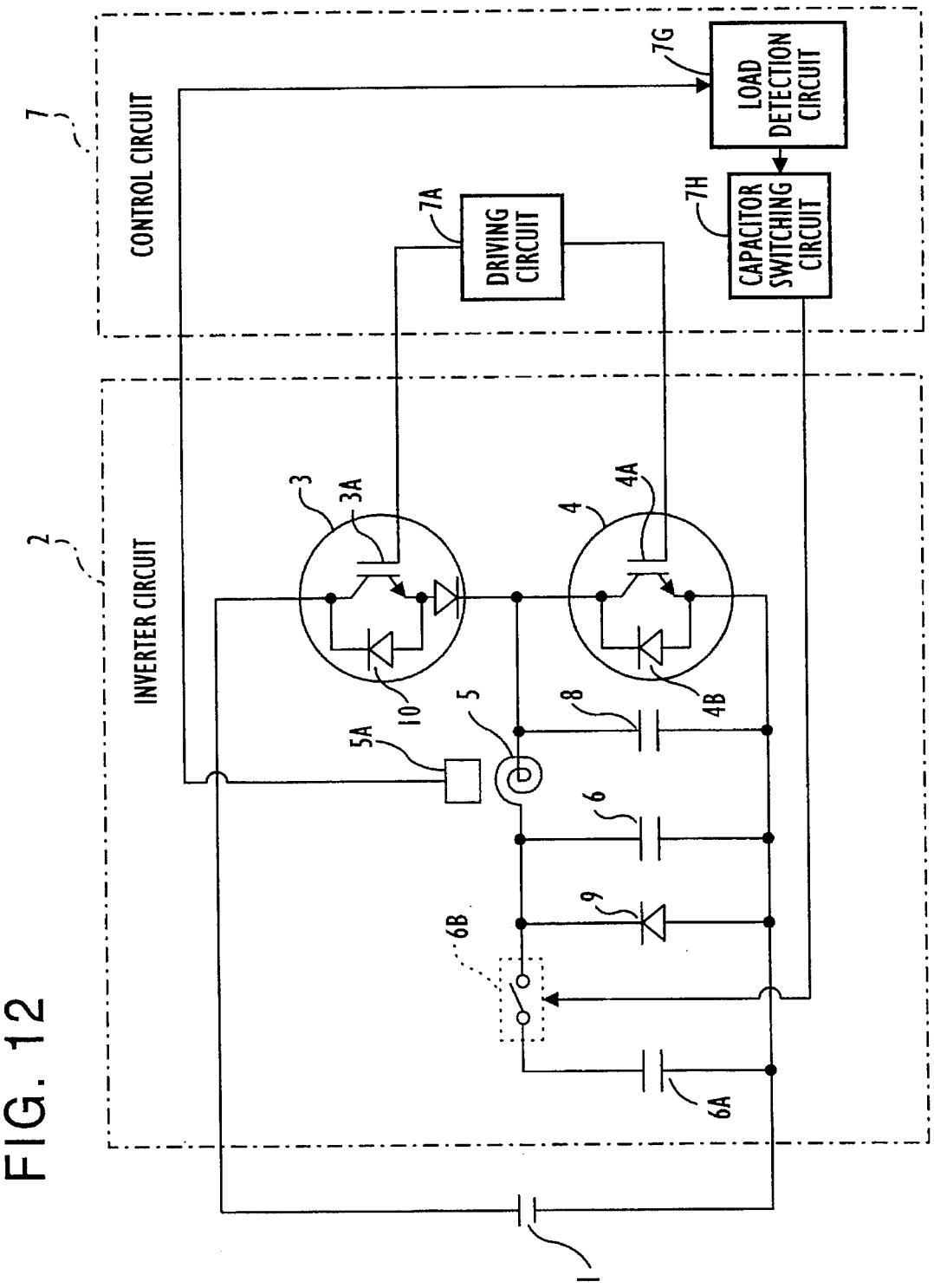
FIG. 12 is a circuit diagram of the induction heating cooker of a sixth embodiment of the present invention.

FIG. 12 is a circuit diagram of the sixth embodiment of the present invention. Referring to FIG. 12, in the inverter circuit 2, a capacitor 6A is coupled in parallel to the resonance capacitor 6 by a switch 6B which is controlled by a capacitor switching circuit 7H Provided in the control circuit 7. A load detection circuit 7G is provided in the control circuit 7. The load detection circuit 7G comprises a magnetic sensor 5A such as a magnet switch for detecting a magnetic load or a non-magnetic load. The detected signal of the magnetic sensor 5A is applied to the capacitor switching circuit 7H. It is to be noted that like parts in FIG. 12 are designated by like reference numerals in FIG. 1. The operation thereof is described hereafter.

Figure 13A:
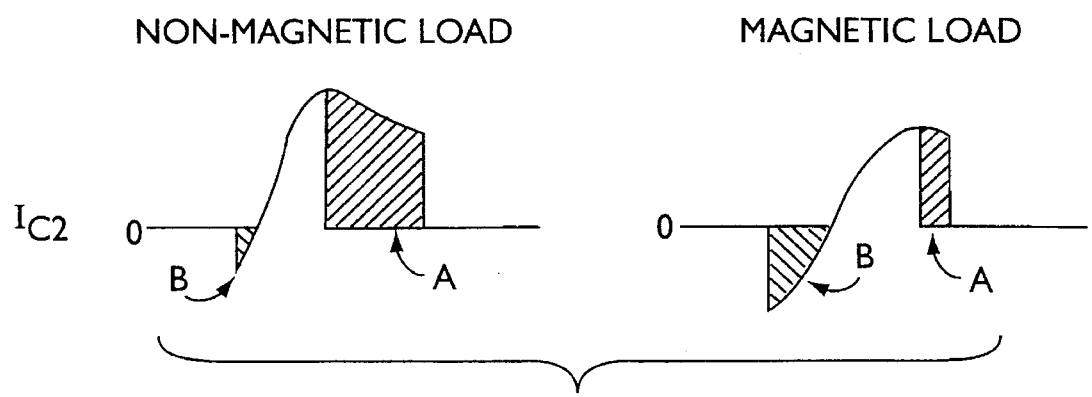
FIG. 13A is a diagram presenting waveforms in operation of the sixth embodiment.
Figure 13B:
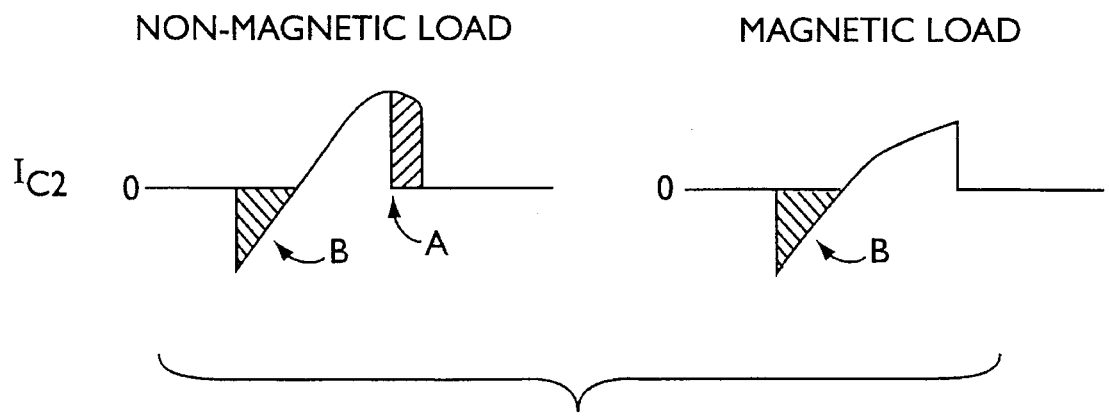
FIG. 13B is a diagram representing waveforms in operation of the sixth embodiment.

In the sixth embodiment, in the case of the magnetic load, the resonance capacitor 6 is coupled as the first resonance capacitor. On the other hand, in the case of the non-magnetic load, both the capacitors 6 and 6A are coupled as the first resonance capacitor by closing the switch 6B. FIG. 13A and FIG. 13B represent waveforms of the current $I_{C2}$ of the switching device 4 in operation of the magnetic load or the non-magnetic load each having substantially the same equivalent resistance. FIG. 13A represents the waveforms in the case that the resonance capacitor 6 is coupled. On the other hand, FIG. 13B represents the waveforms in the case that both the resonance capacitors 6 and 6A are coupled. A relation between the input and the current $I_L$ of the heating coil 5 is represented by equation (5) as shown in the fifth embodiment.

Therefore, provided that the equivalent resistances R of the loads are equal to each other, the inputs become also equal to each other, when an integrated values of the currents $(I_L(t) \times (I_L(t))$ passing through the heating coil 5, namely the integrated values of the currents $(I_{C2}(t) \times (I_{C2}(t))$, are equal to each other.

FIG. 13A represents the waveforms in the case that the integrated value of a current $(I_{C2}(t)) \times (I_{C2}(t))$ are substantially the same. However, since an equivalent inductance L including the heating coil 5 of the non-magnetic load is different from that of the magnetic load, a resonance frequency of the equivalent inductance L and the resonance capacitor 6 in the non-magnetic load is different from that in the magnetic load. Consequently, the waveform in operation of the non-magnetic load is different from that of the magnetic load. As a feature in the operation, in the case of the non-magnetic load, the current passes only through the IGBT 4A of the switching device 4, and in the case of the magnetic load, the forward current passes through the IGBT 4A and the reverse current passes through the diode 10 for conducting the reverse current. In FIG. 13A, hatched parts A represent conducting periods of the diode 9, and hatched parts B represent conducting periods of the diode 4B for conducting reverse current of the switching device 4.

In the above-mentioned operation, since the ON-state voltage of the IGBT 4A is higher in comparison with the ON-state voltage of the diode 4B, even if the integrated values of $(I_{C2}(t)) \times (I_{C2}(t))$ are substantially equal, the ON-state loss of the switching device 4 in the non-magnetic load is larger in comparison with that in the magnetic load. Therefore, in order to suppress the loss in the switching device 4, the output to the non-magnetic load must be suppressed.

In order to suppress the loss in the switching device 4 in an operation mode of the non-magnetic load in a manner similar to the operation mode of the magnetic load, first, the kind of the load (the magnetic load or non-magnetic load) is detected by the load detection circuit 7G comprising the magnetic sensor 5A. In the case of the non-magnetic load, a signal is applied from the load detection circuit 7G to the capacitor switching circuit 7H, and the switch 6B is closed to couple the capacitor 6A in parallel to the resonance capacitor 6 by an output signal of the capacitor switching circuit 7H. Consequently, an operation mode of which the current of the IGBT 4A of the switching device 4 is reduced and the current of the diode 4B thereof is increased is made. The waveforms of the current $I_{C2}$ in this case are shown in FIG. 13B. Referring to FIG. 13B, a hacked part A represents a conducting period of the diode 9 and hacked parts B represents conducting periods of the diode 4B for conducting a reverse current. As shown in FIG. 13B, the ON-state loss of the switching device 4 is reduced and the current passing through the diode 9 is reduced, and the ON-state loss thereof is also reduced.

In the case that the switch 6B is closed thereby to couple the capacitor 6 and 6A with each other and the magnetic object is used as load, the period of an oscillation signal greatly deviates from the period of a resonation of an equivalent inductance L and the capacitance of the capacitors 6 and 6A. Consequently, even if the DUTY FACTORs $T_2/T_1$ of the switching devices 3 and 4 are brought close to 0.5 (namely, even if the input power is made maximum), a desired input can not be attained. Therefore, the capacitance of the first resonance capacitor has to be increased in only the case of the non-magnetic load.

As mentioned above, according to the sixth embodiment, the capacitance of the first resonance capacitor is made switchable, and an operation mode of which the ON-state loss of the switching device 4 and the diode 9 are reduced is realizable by switching the capacitance in accordance with the kind of load (magnetic load or non-magnetic load). Consequently, a high output is possible even in the non-magnetic load.

[Seventh embodiment]

Figure 14:
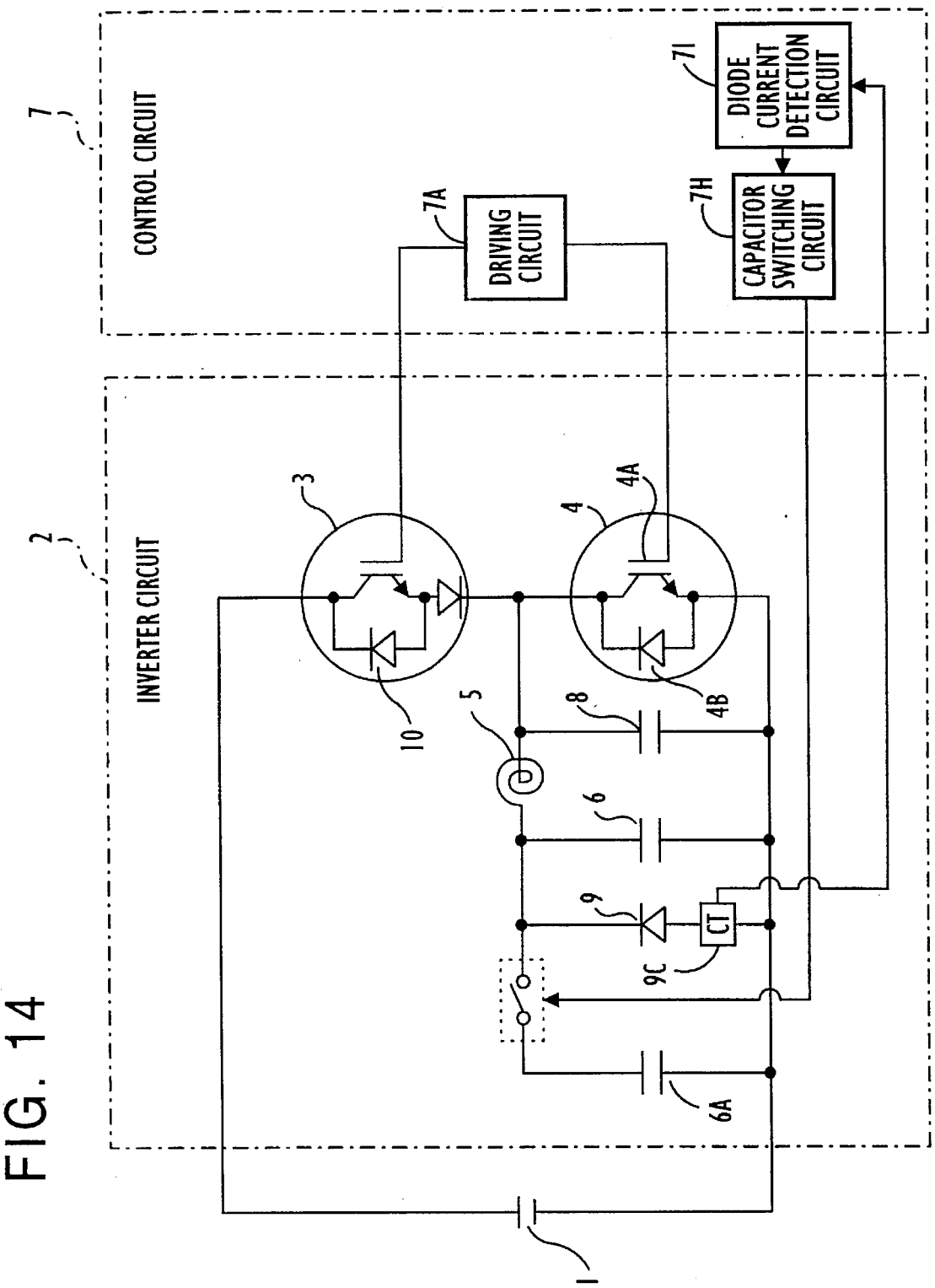
FIG. 14 is a circuit diagram of the induction heating cooker of a seventh embodiment of the present invention.

FIG. 14 is a circuit diagram of the seventh embodiment of the present invention. Referring to FIG. 14, the control circuit 7 comprises a diode current detection circuit 7I for detecting an average current of the diode 9 by the current transformer 9C. It is to be noted that like parts in FIG. 14 are designated by like reference numerals in FIG. 12. In the sixth embodiment, though the load detection circuit 7G using the magnet switch 5A is employed to detect the kind of load in the switch embodiment, in the seventh embodiment an electric circuit is employed to detect the kind of load (magnetic or non-magnetic) in order to reduce a cost and realize a high reliability of the detection circuit.

As described in the sixth embodiment, the waveforms in operation of the non-magnetic load and the magnetic load are different as shown in FIG. 13A by the difference in periods of resonance signals of the equivalent inductance L of the heating coil 5 and the load and the first resonance capacitor 6.

Figure 15:
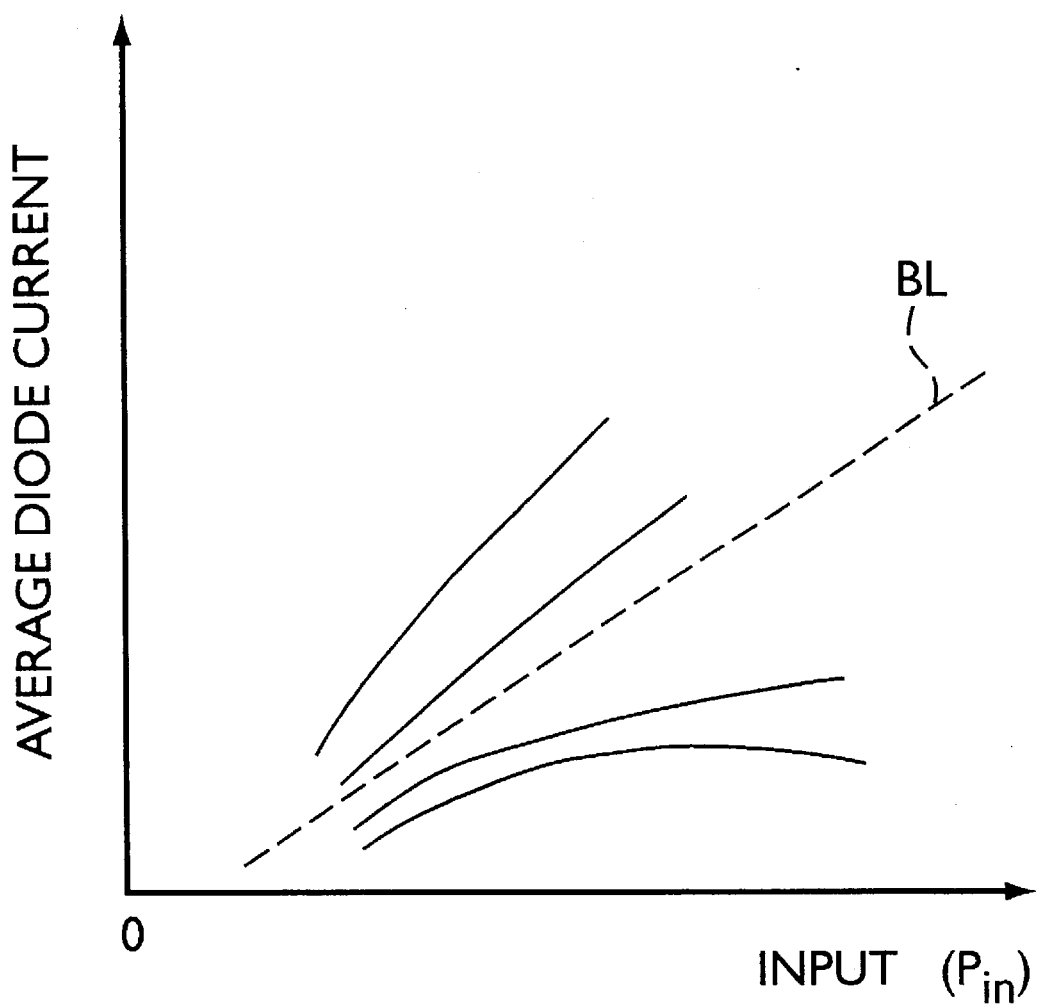
FIG. 15 is a diagram of relation of a current of a diode (average value) versus an input of the induction heating cooker in the seventh embodiment.

FIG. 15 is a diagram representing a relation of the input power $P_{in}$ and an average current of the diode 9. In the diode current detection circuit 7I, an average current of the diode 9 is detected and is corrected by the input power $P_{in}$. In FIG. 15, in the case that a curve representing relation between the average diode current and the input power $P_{in}$ is located in a left-upper area from an oblique broken line BL, the load is determined as the non-magnetic load, and in the case that the curve is located in an right-lower area from the oblique broken line BL, the load is determined as the magnetic load. In the case of the non-magnetic load, a signal is applied from the load current detection circuit 7I to the capacitor switching circuit 7H, and the resonance capacitor 6A is coupled in parallel to the resonance capacitor 6. Consequently, the current of the IGBT 4A of the switching device 4 is reduced, and the operation mode for increasing the current of the diode 4B is realized. Therefore, the ON-state loss of the switching device 4 is reduced and the current of the diode 9 is also reduced, and hence the ON-state loss thereof is reduced.

According to the seventh embodiment, the capacitance of the first resonance capacitor 6 is switched by measuring the average current of the diode 9 by the diode current detection circuit 7I and correcting the input and comparing with a determination level (represented by broken line BL in FIG. 5). Consequently, the operation mode of which the ON-state losses of the second switching device 4 and the diode 9 can be reduce is realized, and the heating operation of a high output is realized even in the non-magnetic load.

[Eighth embodiment]

Figure 16:
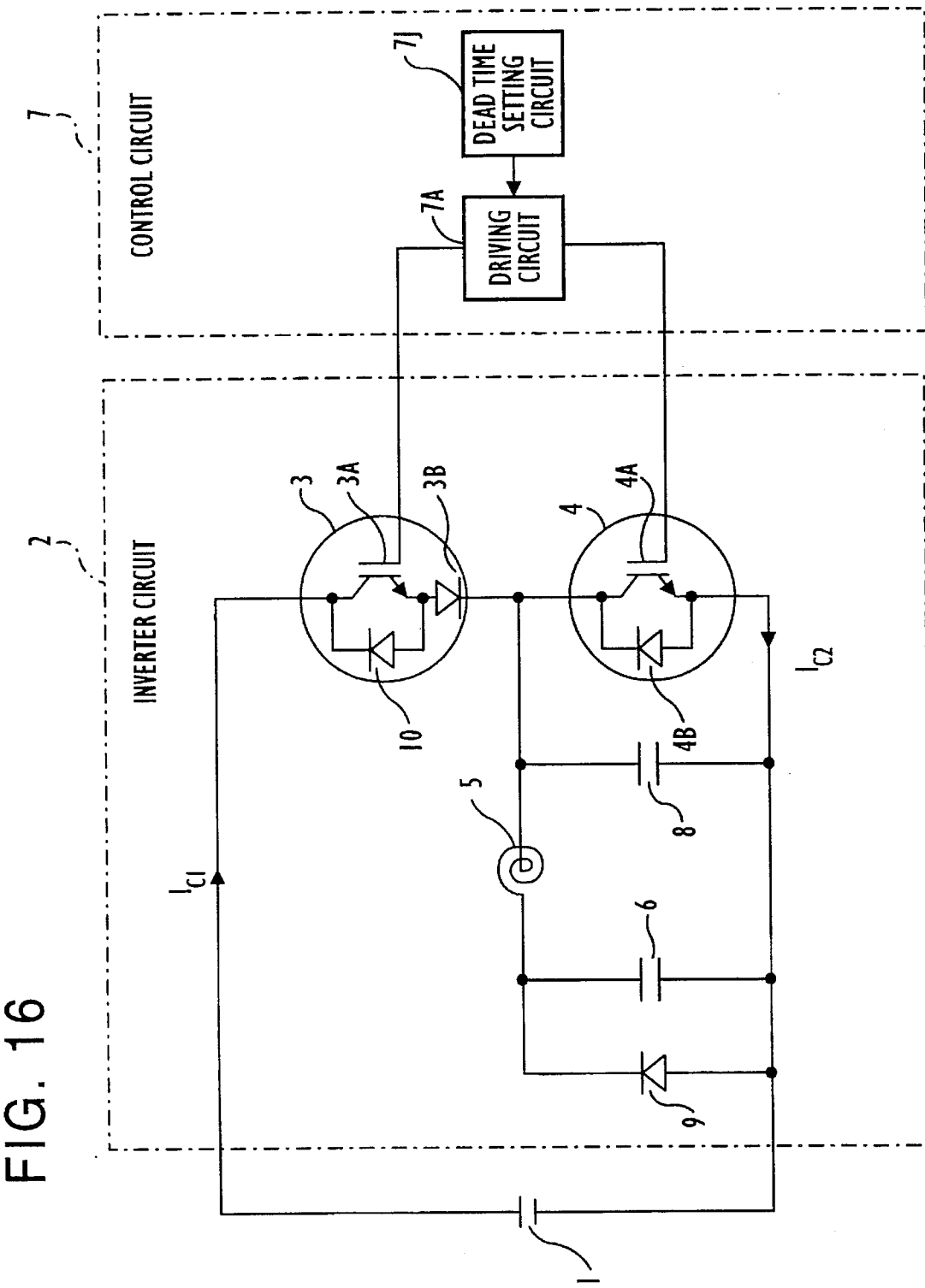
FIG. 16 is a circuit diagram of the induction heating cooker of a eighth embodiment of the present invention.
Figure 17A:
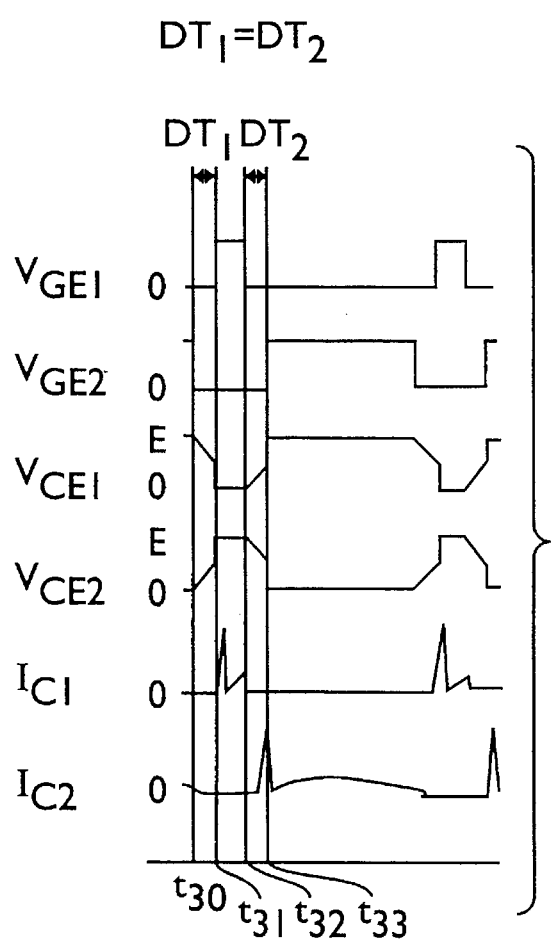
FIG. 17A is a diagram representing waveforms in operation of the eighth embodiment.
Figure 17B:
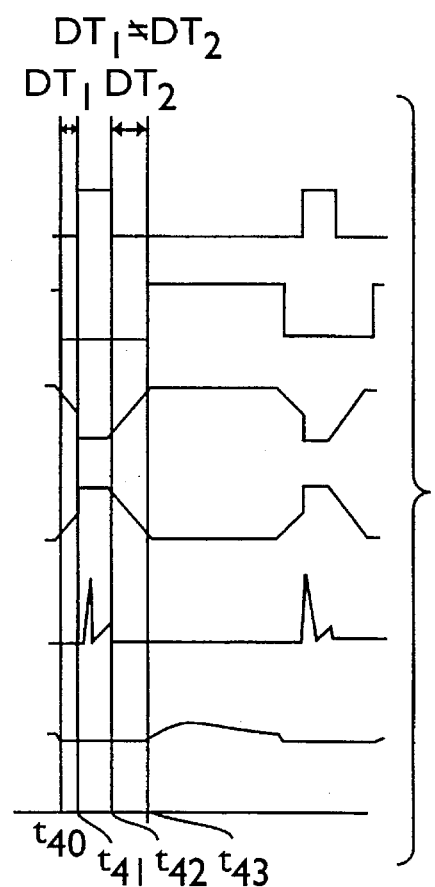
FIG. 17B is a diagram representing waveforms in operation of the eighth embodiment.

FIG. 16 is a circuit diagram of the eighth embodiment of the present invention. Waveforms in operation of the circuit are shown in FIG. 17A and FIG. 17B In the eighth embodiment, the control circuit 7 comprises a dead time setting circuit 7J. A first dead time period $DT_1$ defined as a period from turn-OFF of the switching device 4 to turn-ON of the switching device 3 and a second dead time $DT_2$ defined as a period from turn-OFF of the switching device 3 to turn-ON the switching device 4 are set by the dead time setting circuit 7.

The operation is described with reference to FIG. 17A and FIG. 17B in the case of the DUTY FACTOR $T_2/T_1 \ll 0.5$. FIG. 17A represents waveforms in the case that the length of dead time $DT_1$ is equal to the length of dead time $DT_2$, and FIG. 7B represents waveforms in the case that the lengths of dead times $DT_1$ and $DT_2$ are set to each other different values. In FIG. 7A and FIG. 7B, the dead time $DT_1$ is set adjacent to a phase of which the resonance voltage (=$V_{CE2}$) of the resonance capacitor 8 becomes a maximum value so that the voltage $VCE_1$ (=E–$V_{CE2}$>0) in turn-ON state of the switching device 8 generated in the case of DUTY FACTOR $T_2/T_1 \ll 0.5$ become a minimum. Moreover, the value of the dead time $DT_2$ is set to the same value as the dead time $DT_1$ in FIG. 17A, and is set in a period that the voltage $V_{CE2}$ in turn-ON state of the switching device 4 generated in the case that the DUTY FACTOR $T_2/T_1 \ll 0.5$ becomes zero in FIG. 17B. The dead time $DT_2$ is set to a different value from the dead time $DT_1$, and the dead time $DT_1$ and $DT_2$ are optimized in each design condition. The above-mentioned dead times $DT_1$ and $DT_2$ are set by the dead time setting circuit 7J which controls the driving circuit 7A on the basis of the dead times $DT_1$ and $DT_2$ set thereby.

As been apparent from FIG. 17A and FIG. 17B, since the values of the dead times $DT_1$ and $DT_2$ are set to separate values and are optimized in each design condition, the voltage at the turn-ON operation of the switching device 3 can be minimized in operation of the case of DUTY FACTOR $T_2/T_1 \ll 0.5$. Moreover, turn-ON operation of the switching device 4 is prevented and zero voltage switching operation is realized, and noise, the loss and stress in the switching devices can be reduced.

[Ninth embodiment]

Figure 18:
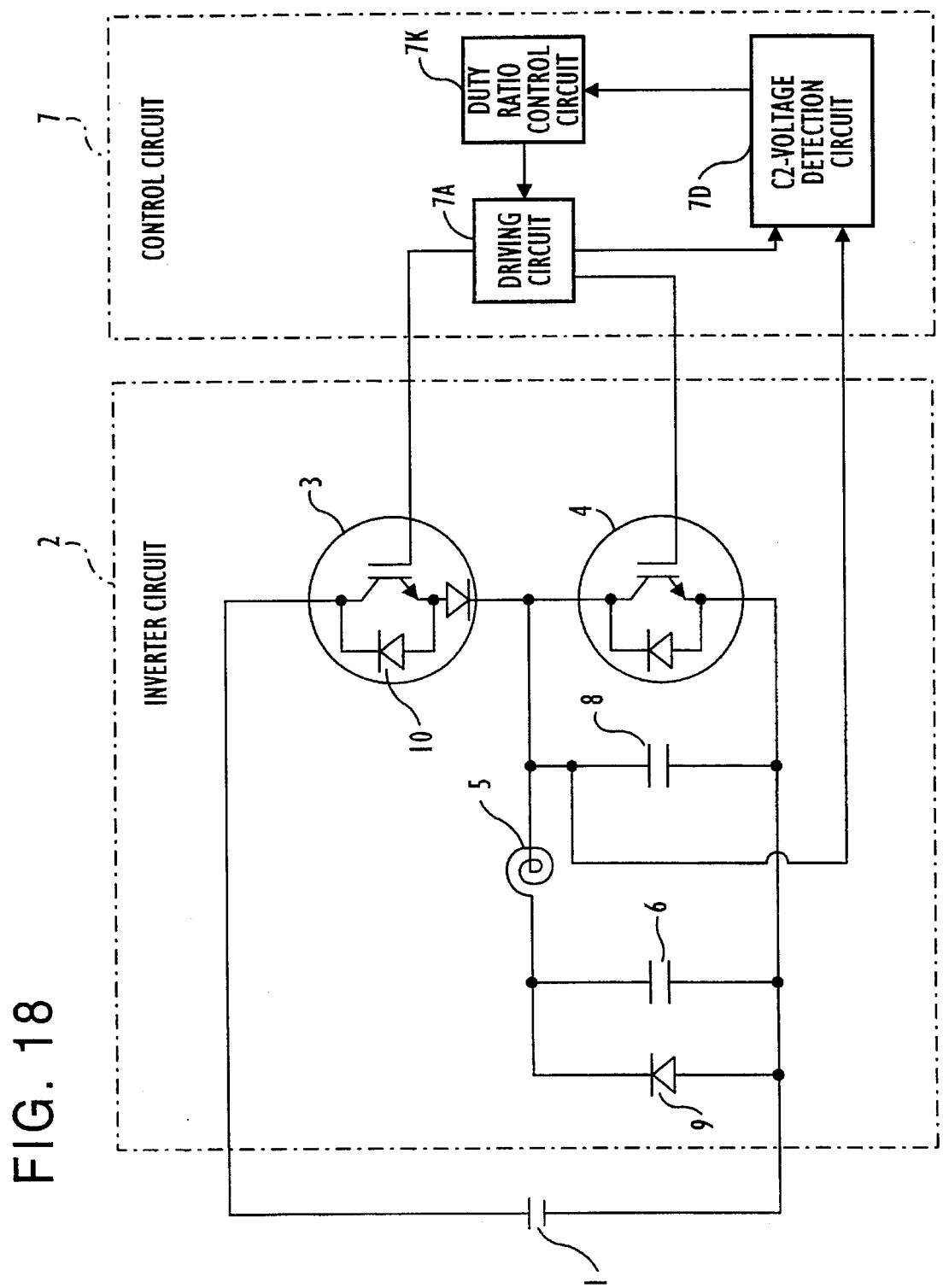
FIG. 18 is a circuit diagram of the induction heating cooker of a ninth embodiment of the present invention.

FIG. 18 is a circuit diagram of the ninth embodiment of the present invention. Referring to FIG. 18, the control circuit 7 comprises a duty ratio control circuit 7K. It is to be noted that like parts in FIG. 18 are designated by like reference numerals in FIG. 8.

The operation of the ninth embodiment is described hereafter. First, when the input is large such as the DUTY FACTOR $T_2/T_1 \approx 0.5$, the peak voltage of the resonance capacitor 8 becomes higher than the voltage E of the direct current source 1, and the voltage $V_{CE1}$ of the switching device 3 becomes lower than zero ($V_{CE1}$=E–$V_{CE2}$<0). Therefore, turn-ON operation does not occur. In the C2-voltage detection circuit 7D, it is detected that the voltage of the resonance capacitor 8 is higher than the voltage E of the direct current source 1, and the switching devices 3 and 4 are alternately driven at a predetermined DUTY FACTOR by the driving circuit 7A. Therefore, the inverter is continuously oscillated.

Subsequently, when the input is gradually increased by changing the DUTY FACTOR $T_2/T_1$, the voltage of the resonance capacitor 8 gradually lowers in compliance with the decrease of the input. The voltage of the resonance capacitor 8 is detected by the C2-voltage detection circuit 7D, and when the voltage of the resonance capacitor 8 becomes lower than the voltage E of the direct current source 1, the DUTY FACTOR $T_2/T_1$ is controlled to a predetermined constant value by the DUTY control circuit 7K of the control circuit 7. The inverter circuit 2 is controlled by the duty ratio control circuit 7K so that the oscillation or suspension of the oscillation is alternately repeated and an average input is varied by changing a ratio of an oscillation time length to a suspension time length. The above-mentioned control is defined as "DUTY CONTROL" in the present invention. In the case that the DUTY FACTOR $T_2/T_1$ in the DUTY CONTROL is set so that the voltage of the resonance capacitor 8 is equal to the voltage E of the direct current source 1, the turn-ON operation does not occur in the switching device 3 even if the input is small.

In the ninth embodiment, the turn-ON operation does not occur in the switching devices 3 and 4 even if the input is reduced to a low level, and "zero voltage switching operation" is maintained. The zero voltage switching operation means switching operation in the state that a voltage is not applied. Consequently, the induction heating cooker of low noise and low loss having a wide variable range of the input can be provided.

Incidentally, the value of the DUTY FACTOR $T_2/T_1$ in the DUTY CONTROL operation can be set to a value of which the turn-ON operation occurs, if a trouble does not occur.

According to the ninth embodiment, the C2-voltage detection circuit 7D detects the state of operation of the inverter circuit 2, and the control circuit switches the input control method from the DUTY FACTOR varying control to the DUTY CONTROL in accordance with the output of the C2-voltage detection circuit 7D, so as to reduce stress which is given to the switching devices 3 and 4. Consequently, the noise and the loss are reduced, and a range corresponding to the load is made wide.

[Tenth embodiment]

Figure 19:
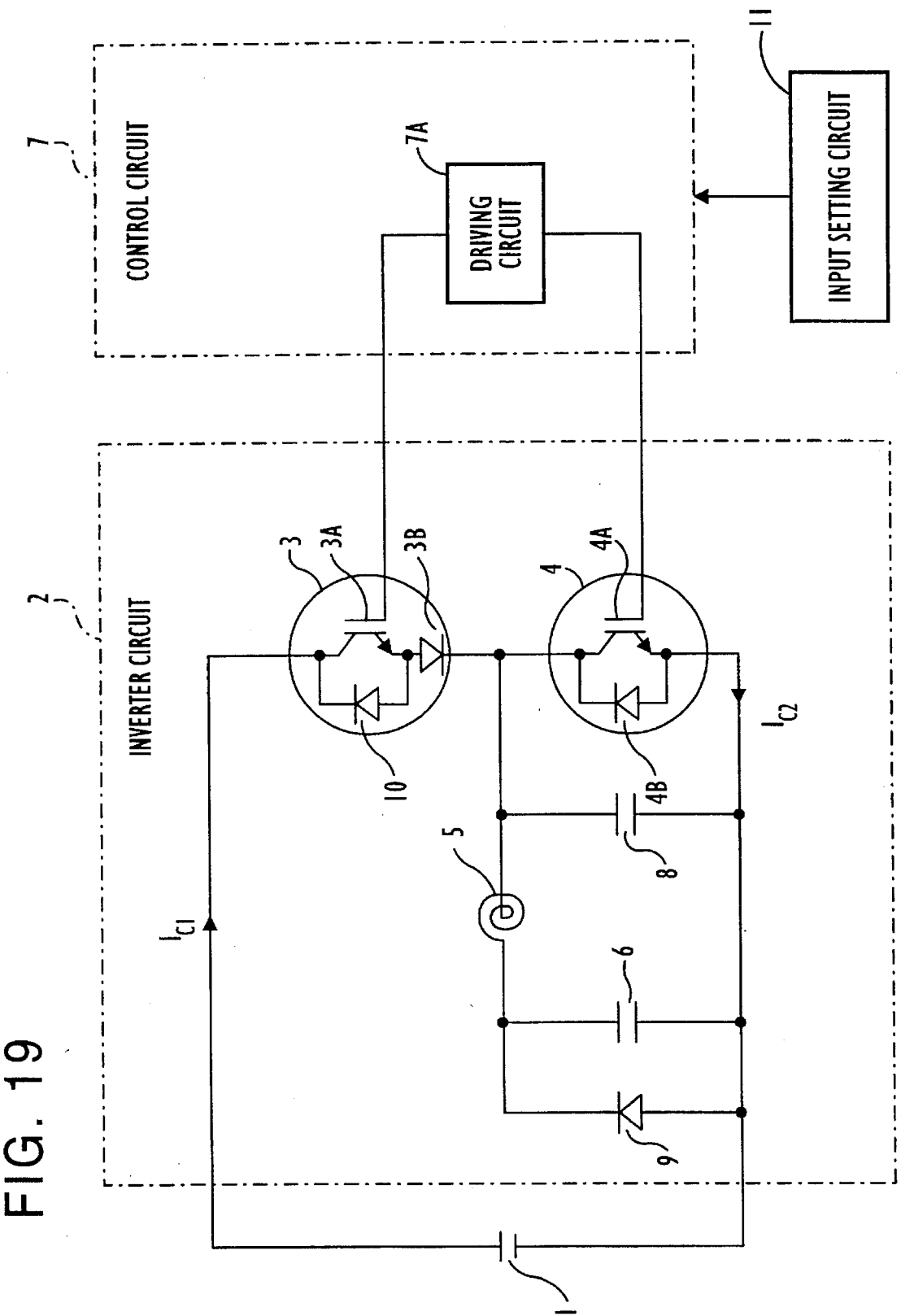
FIG. 19 is a circuit diagram of the induction heating cooker of a tenth embodiment of the present invention.
Figure 20:
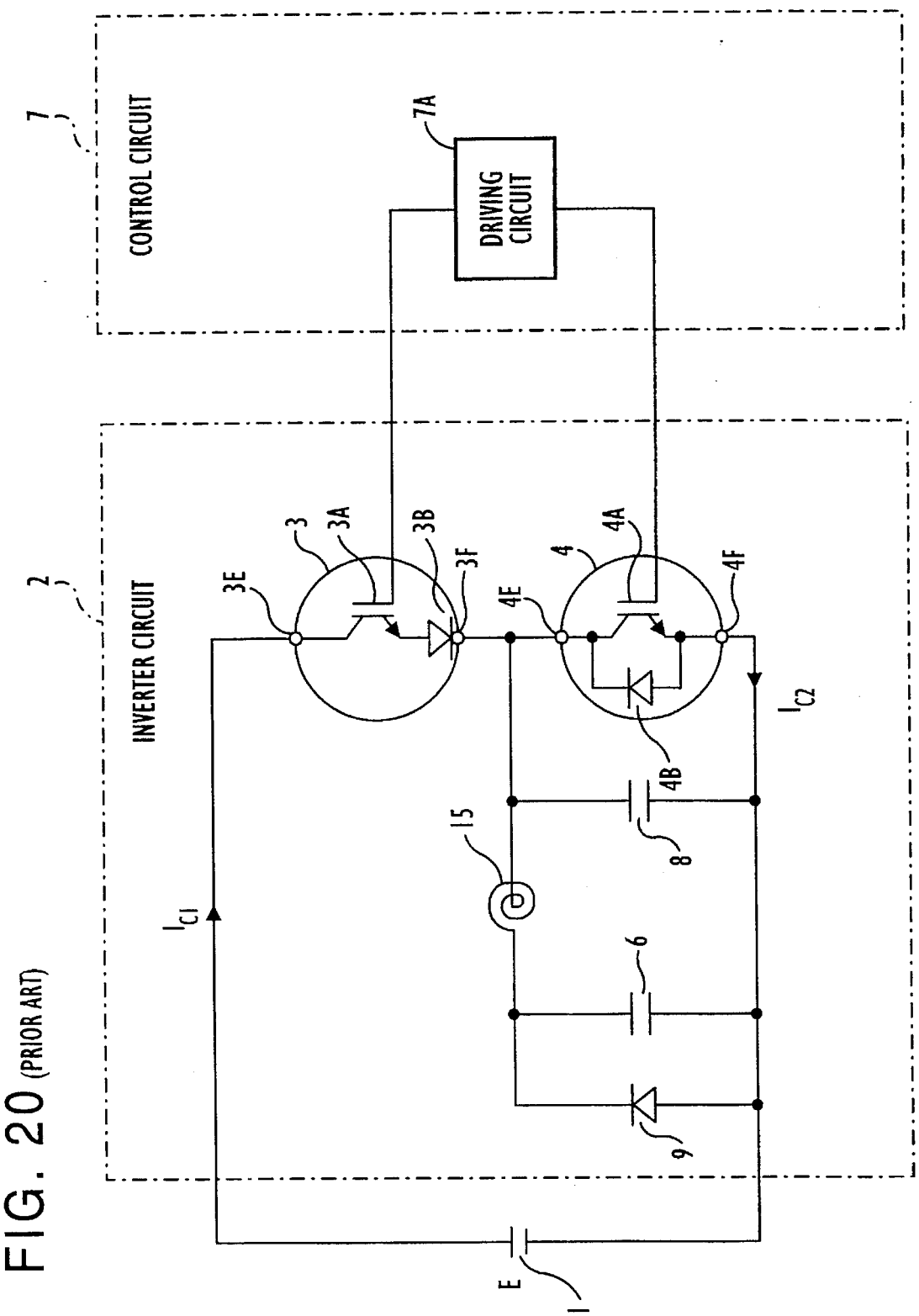
FIG. 20 is the circuit diagram of the induction heating cooker in the prior art.
Figure 21A:
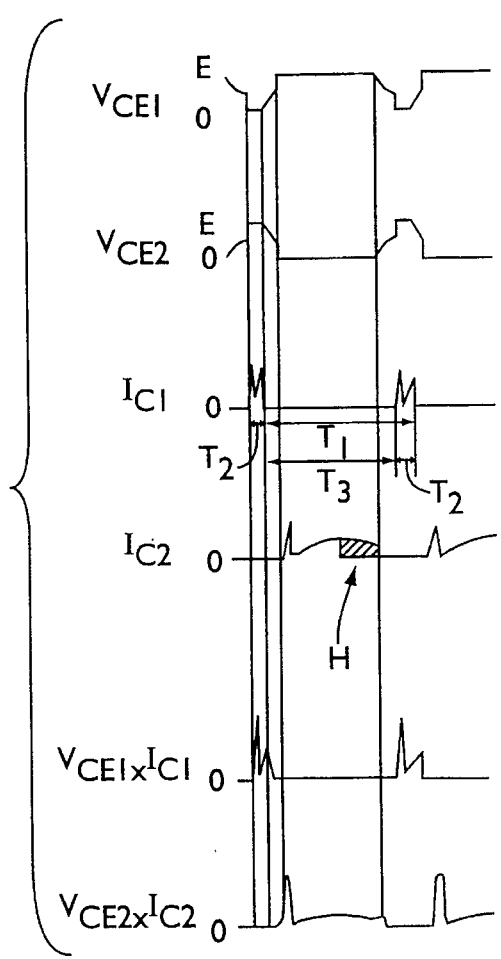
FIG. 21A is the diagram representing the waveforms in operation of the induction heating cooker in the prior art.
Figure 21B:
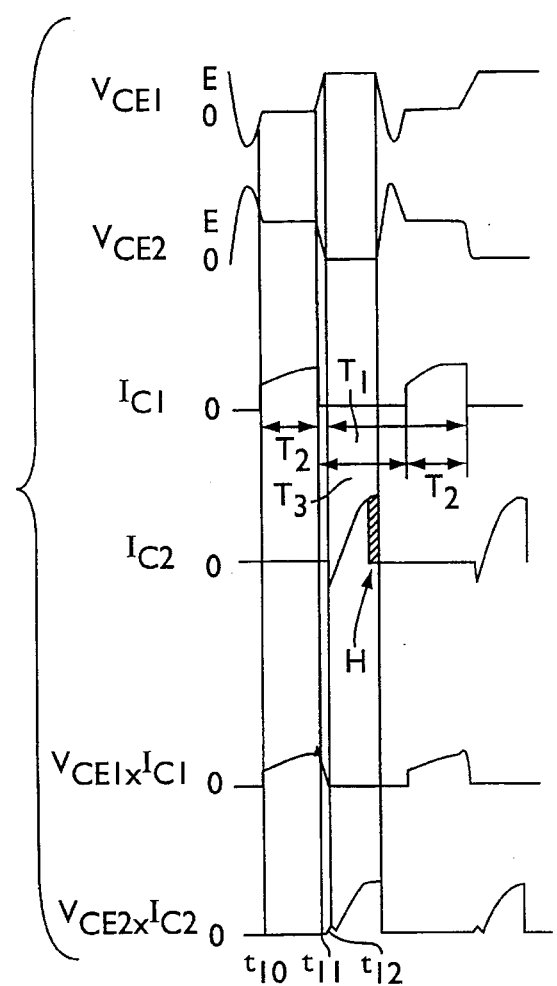
FIG. 21B is the diagram representing the waveforms in operation of the induction heating cooker in the prior art.
Figure 21C:
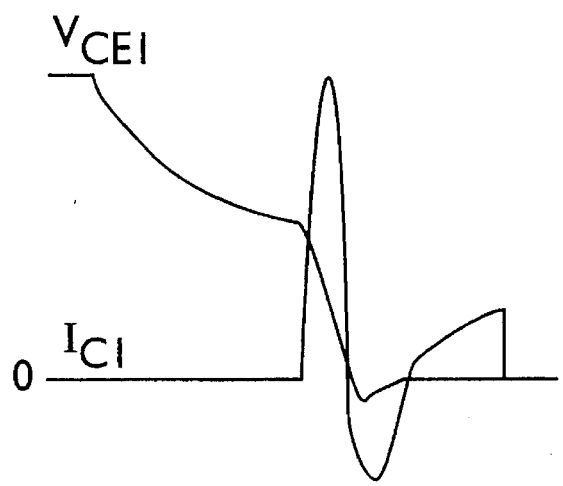
FIG. 21C is the diagram representing the waveforms in operation of the switching device of the induction heating cooker in the prior art.
Figure 22:
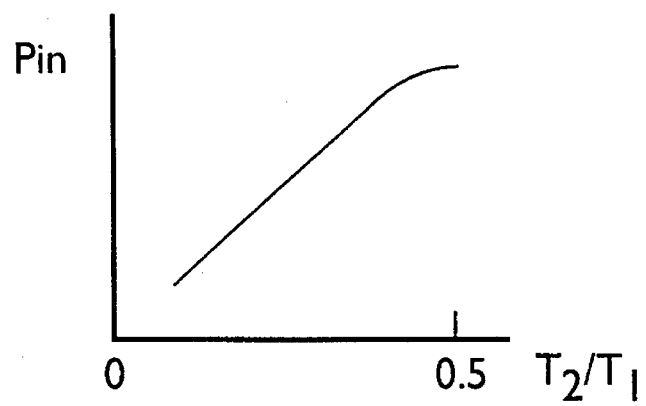
FIG. 22 is a diagram representing relation of DUTY FACTOR of the switching element versus an input of the induction heating cooker in the prior art.

FIG. 19 is a circuit diagram of the tenth embodiment of the present invention. Referring to FIG. 19, an input setting circuit 11 for setting one of six level of an input value by a user is disposed outward from the control circuit 7. It is to be noted that like parts in FIG. 19 are designated by like reference numerals in FIG. 1.

In operation, in the case that a level to be set by the user in the input setting circuit 11 is a third level or more of the six levels, the inverter circuit 2 is continuously activated at a DUTY FACTOR $T_2/T_1$ corresponding to predetermined respective set input values.

On the other hand, in the case that a level to be set by the user in the input setting circuit 11 is a second level or below of the six levels, the DUTY FACTOR $T_2/T_1$ is kept to a value corresponding to the input values of the third level by the control circuit 7. The control of the control circuit 7 is changed to such DUTY CONTROL that the oscillation or suspension of the oscillation in the inverter 2 is alternately repeated and the average input is varied by changing a ratio of the time length of the oscillation to the time length of the suspension. By designing the control circuit 7 so that the turn-ON operation does not occur in two switching devices 3 and 4 at the third level set in the input setting circuit 11, the turn-ON operation does not occur in two switching devices 3 and 4 at any setting levels.

According to the tenth embodiment, the switching device 3 and the switching device 4 can be operated by the zero-voltage switching operation without using a circuit for detecting the condition of operation of the inverter 2 such as the voltage detection circuit of the second resonance capacitor 8. Therefore, it is possible to provide an induction heating cooker structured with an inexpensive circuit and having a wide variable range of the input, a low noise and a low loss.

Incidentally, the number of setting levels in the input setting circuit 11 are not limited to the above-mentioned six. Moreover, the setting value of the DUTY FACTOR $T_2/T_1$ at the third level is not needed to be a value of which the turn-ON operation does not absolutely occur. The setting value is permitted to be a value at which the turn-ON operation occurs in the absence of a problem.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An induction heating cooker comprising:

a heating coil, a first resonance capacitor which is coupled at one end thereof to one end of said heating coil and connected at the other end thereof to a direct current source, a diode coupled in parallel with said first resonance capacitor, a first switching device of a reverse current blocking type coupled at one end thereof to the other end of said heating coil, a second switching device of a reverse current conducting type coupled at one end thereof to said one end of said first switching device and to the other end of said heating coil and coupled at the other end thereof to said other end of said first resonance capacitor, a second resonance capacitor coupled across said second switching device, a control circuit comprising driving means for alternately conducting said first switching device and said second switching device at a constant frequency and for varying a DUTY FACTOR defined as a ratio of a conductive period of one of said two switching devices to a period of said signal of said constant frequency, and an oppositely poled diode coupled across the collector-emitter portion of a switching element provided in said first switching device.

2. An induction heating cooker in accordance with claim 1, wherein diode current detection means for detecting a current passing through said diode coupled in parallel with said first resonance capacitor is further comprised in said control circuit, and the DUTY FACTOR of said switching devices is varied on the basis of the output of said diode current detection means.

3. An induction heating cooker in accordance with claim 1, wherein first voltage detection means for detecting a voltage of said first resonance capacitor is further comprised in said control circuit, and the DUTY FACTOR of said switching devices is varied on the basis of the output of said first voltage detection means.

4. An induction heating cooker in accordance with claim 1 further comprising:

second voltage detection means for detecting a voltage of said second resonaance capacitor, wherein DUTY FACTORs of said switching devices are varied on the basis of an output of said second voltage detection means in the control circuit.

5. An induction heating cooker in accordance with claim 1 further comprising:

second voltage detection means for detecting a voltage of said second resonance capacitor disposed in said control circuit, input detection means for detecting an input, and load determination means for determining an inadequate load on the basis of the outputs of said second voltage detection means and said input detection means.

6. An induction heating cooker in accordance with claim 1, wherein the capacitance of said first resonance capacitor is variable.

7. An induction heating cooker in accordance with claim 6 further comprising:

diode current detection means for detecting a current of said diode, and switching means for changing the capacitance of said first resonance capacitor on the basis of the detected value of said diode current detection means.

8. An induction heating cooker in accordance with claim 1, wherein a first dead time defined as a time period from turn-OFF of said first switching device to turn-ON of said second switching device is set to a different value from a second dead time defined as a time period from turn-OFF of said second switching device to turn-ON of said first switching device.

9. An induction heating cooker in accordance with claim 1 further comprising:

second voltage detection means for detecting a voltage of said second resonance capacitor, wherein in the case that the output of said second voltage detection means is a predetermined value and below, operation or suspension of said operation of said switching devices is alternately repeated by said control circuit and an input is controlled by changing a ratio of a time length of said operation to a time length of said suspension.

10. An induction heating cooker in accordance with claim 1 further comprising:

input setting means for setting an input by a user, wherein in the case that the input set by said user is a predetermined value and below, operation or suspension of said operation of said switching devices is alternately repeated by said control circuit and said input is controlled by changing a ratio of a time length of said operation to a time length of said suspension.

11. An induction heating cooker comprising:

a first switching device and a second switching device connected in series across both ends of a direct current source, a heating coil connected at one end to a junction of one end of said first switching device and one end of said second switching device, a first resonance capacitor connected across the other end of said heating coil and the other end of said second switching device, a diode connected across both ends of said first resonance capacitor so that a current passes through a loop of said heating coil, said second switching device and said diode in the direction from said heating coil to said diode through said second switching device, and a second resonance capacitor connected in parallel to said second switching device, wherein a first dead time defined as a time period from turn-OFF of said first switching device to turn-ON of second switching device is set to a different value from a second dead time defined as a time period from turn-OFF of second switching device to turn-ON of said first switching device.

12. An induction heating cooker comprising:

a first switching device and a second switching device connected in series across both ends of a direct current source, a heating coil connected at one end to a junction of one end of said first switching device and one end of said second switching device, a first resonance capacitor connected across the other end of said heating coil and the other end of said second switching device, a diode connected across both ends of said first resonance capacitor so that a current passes through a loop of said heating coil, said second switching device and said diode in the direction from said heating coil to said diode through said second switching device, a second resonance capacitor connected in parallel to said second switching device, and second voltage detection means for detecting a voltage of said second resonance capacitor, wherein in the case that the output of said second voltage detection means is a predetermined value and below, operation or suspension of said operation of said switching devices is alternately repeated by said control circuit and an input is controlled by changing a ratio of a time length of said operation to a time length of said suspension.

13. An induction heating cooker comprising:

a first switching device and a second switching device connected in series across both ends of a direct current source, a heating coil connected at one end to a junction of one end of said first switching device and one end of said second switching device, a first resonance capacitor connected across the other end of said heating coil and the other end of said second switching device, a diode connected across both ends of said first resonance capacitor so that a current passes through a loop of said heating coil, said second switching device and said diode in the direction from said heating coil to said diode through said second switching device, a second resonance capacitor connected in parallel to said second switching device, and input setting means for setting an input by a user, wherein, in the case that the input set by said user is a predetermined value and below, operation or suspension of said operation of said switching devices is alternately repeated by said control circuit and said input is controlled by changing a ratio of a time length of said operation to a time length of said suspension.

* * * * *